July 29, 1958 J. J. WARNER 2,844,927
BOX FOLDING AND LOADING MACHINE
Filed May 20, 1952 10 Sheets-Sheet 1
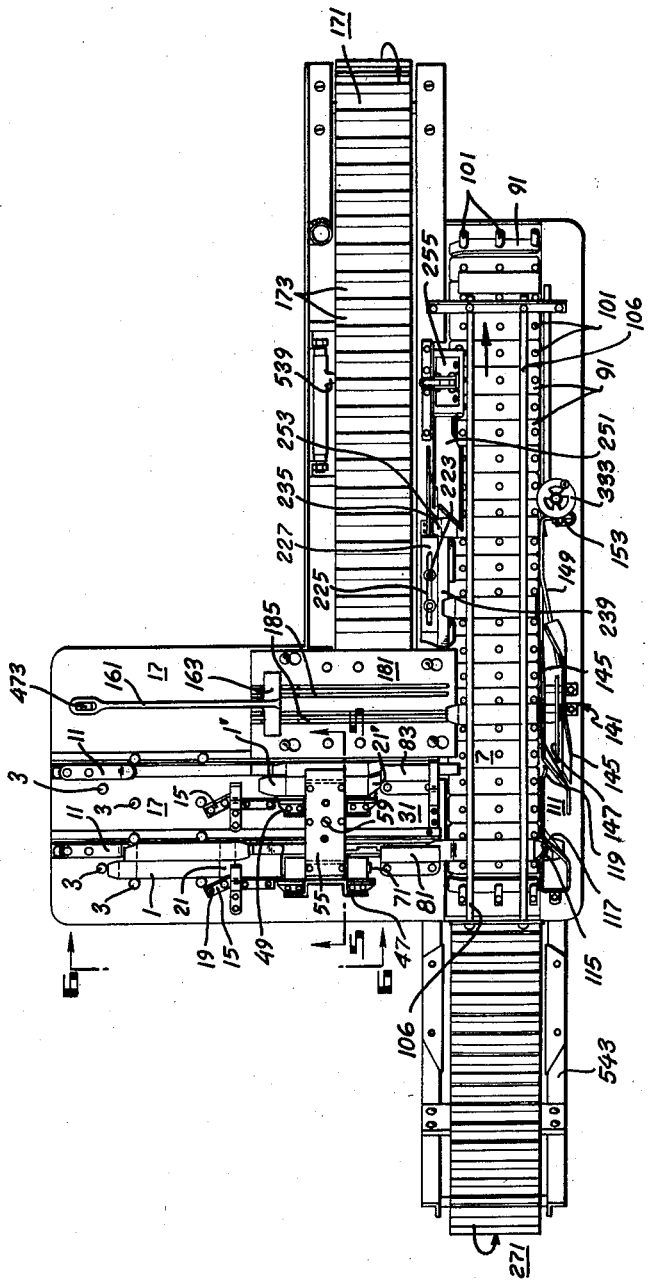
INVENTOR.
JESSE J. WARNER
BY
Lippincott & Smith
ATTORNEYS July 29, 1958
J. J. WARNER
2,844,927
BOX FOLDING AND LOADING MACHINE
Filed May 20, 1952
10 Sheets-Sheet 2
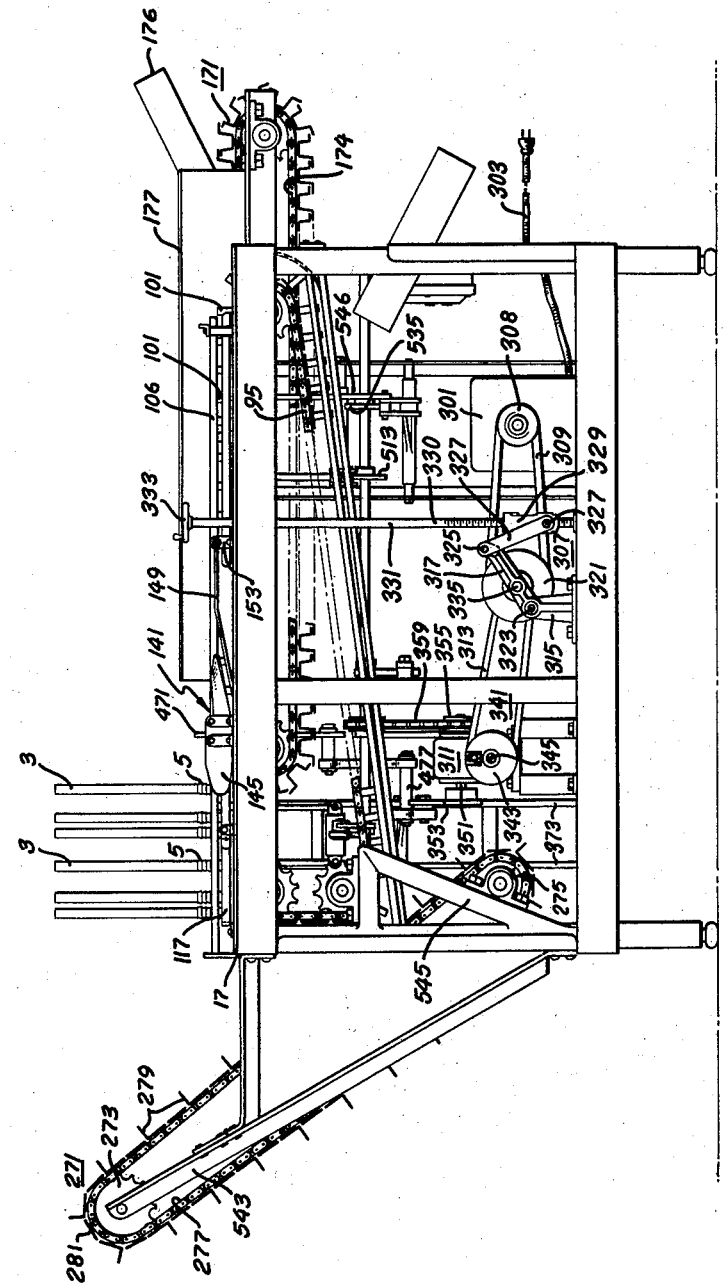
FIG_2
INVENTOR.
JESSE J. WARNER
BY
Lippincott & Smith.
ATTORNEY

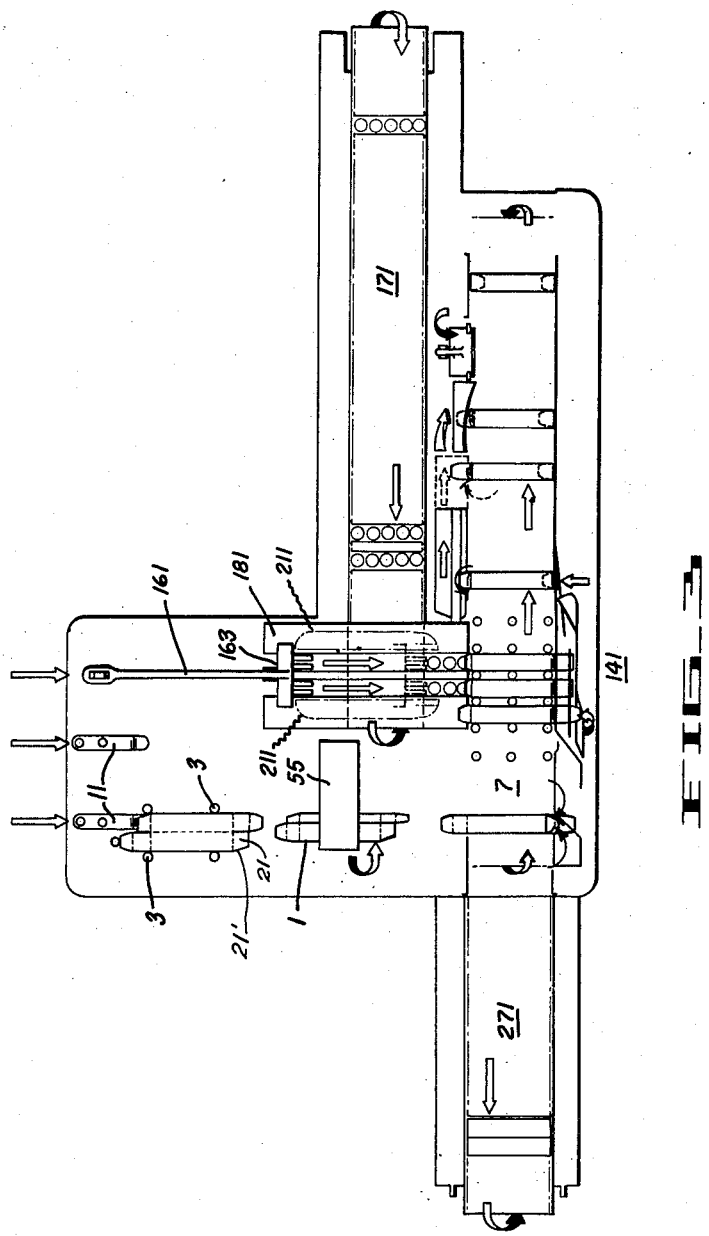

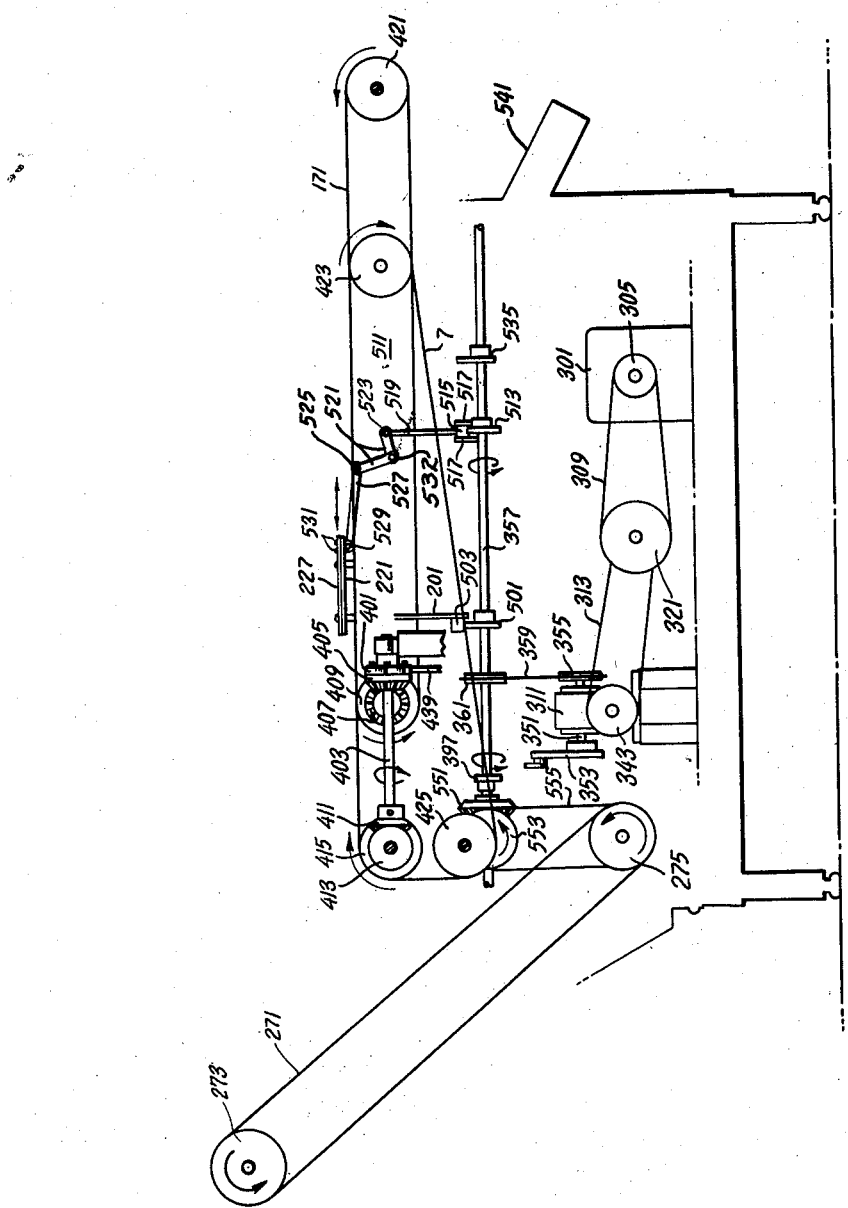

July 29, 1958  J. J. WARNER  2,844,927
BOX FOLDING AND LOADING MACHINE
Filed May 20, 1952  10 Sheets-Sheet 5
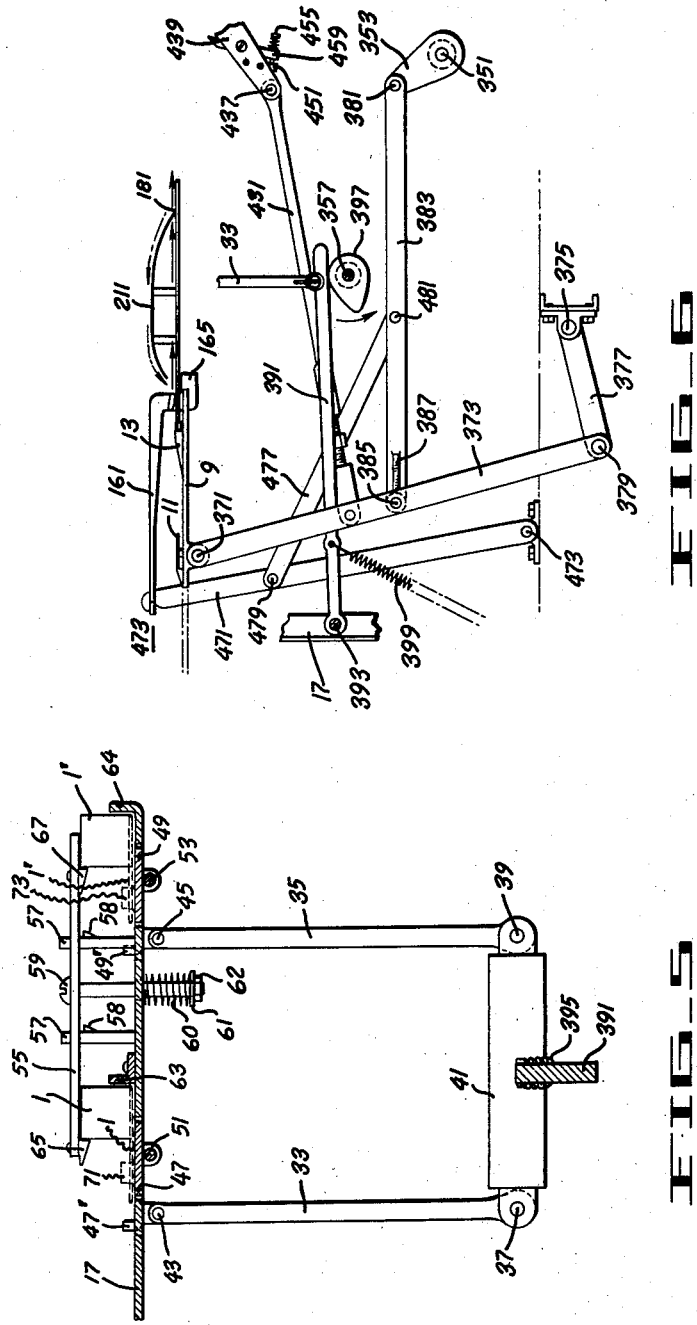
INVENTOR.
JESSE J. WARNER
BY
Lippincott & Smith.
ATTORNEYS

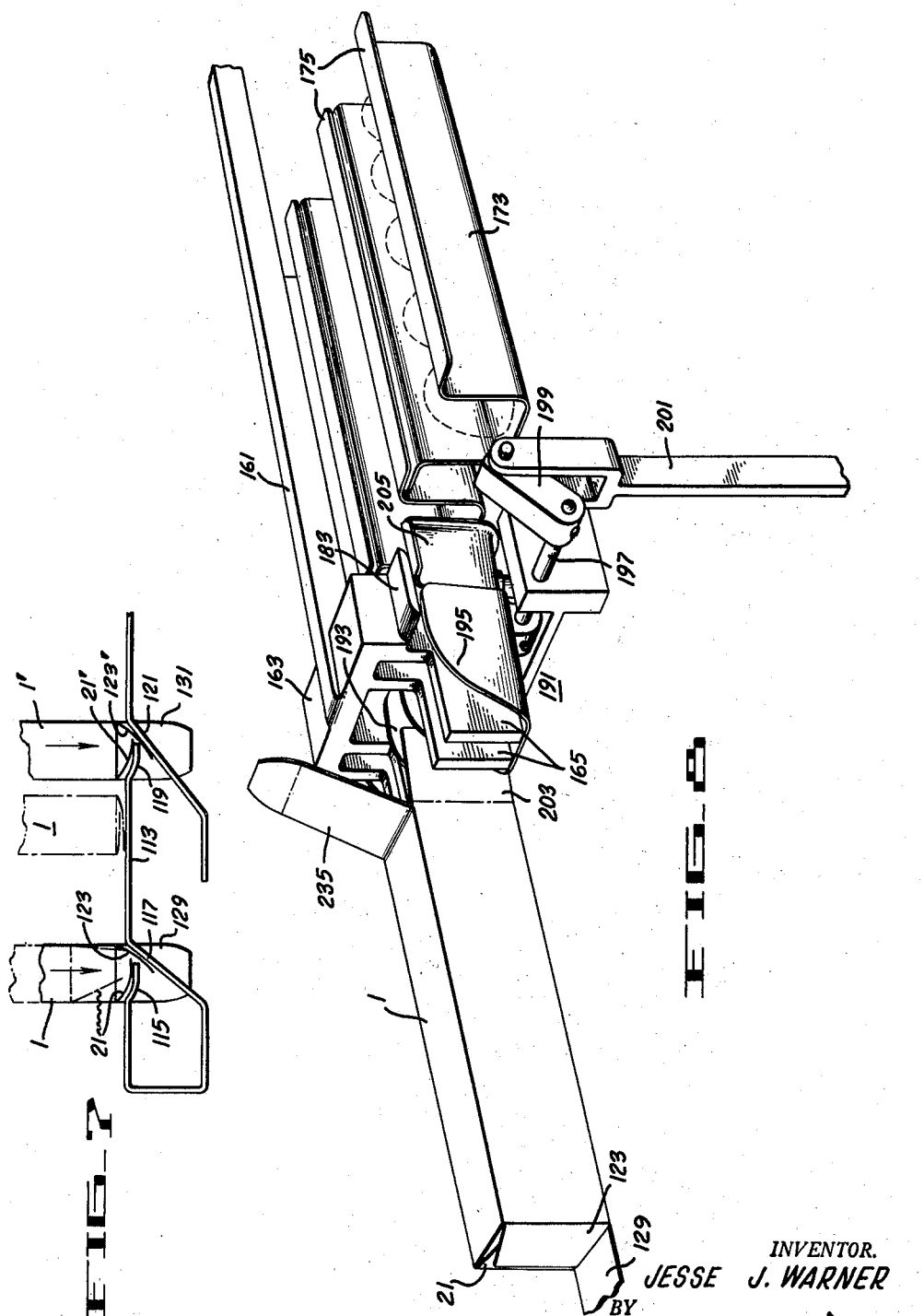

July 29, 1958 J. J. WARNER 2,844,927
BOX FOLDING AND LOADING MACHINE
Filed May 20, 1952 10 Sheets-Sheet 7
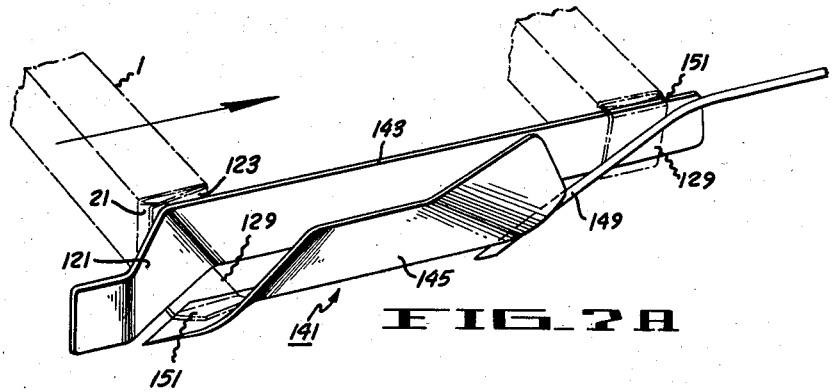
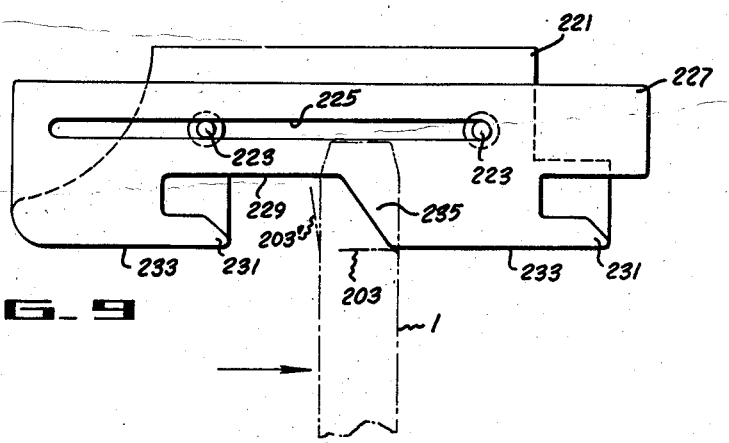
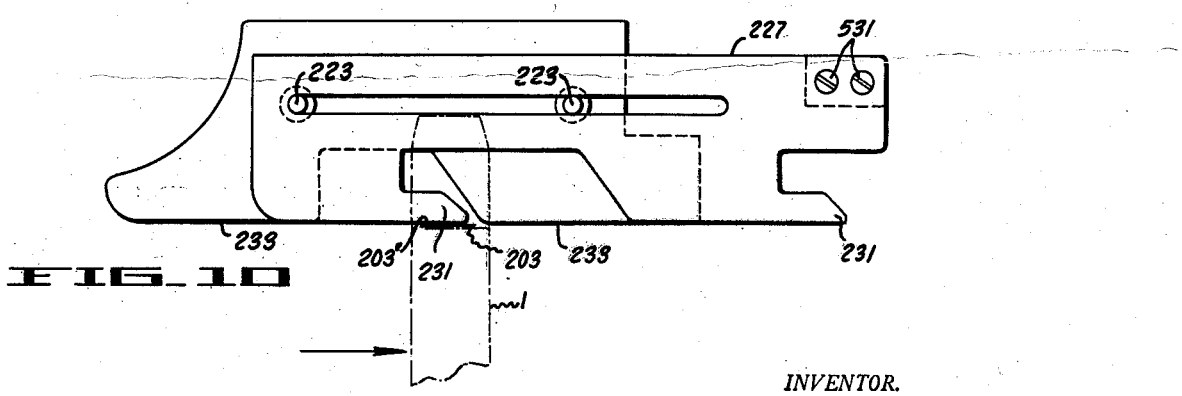
INVENTOR.
JESSE J. WARNER
BY
ATTORNEYS July 29, 1958  J. J. WARNER  2,844,927
BOX FOLDING AND LOADING MACHINE
Filed May 20, 1952  10 Sheets-Sheet 8
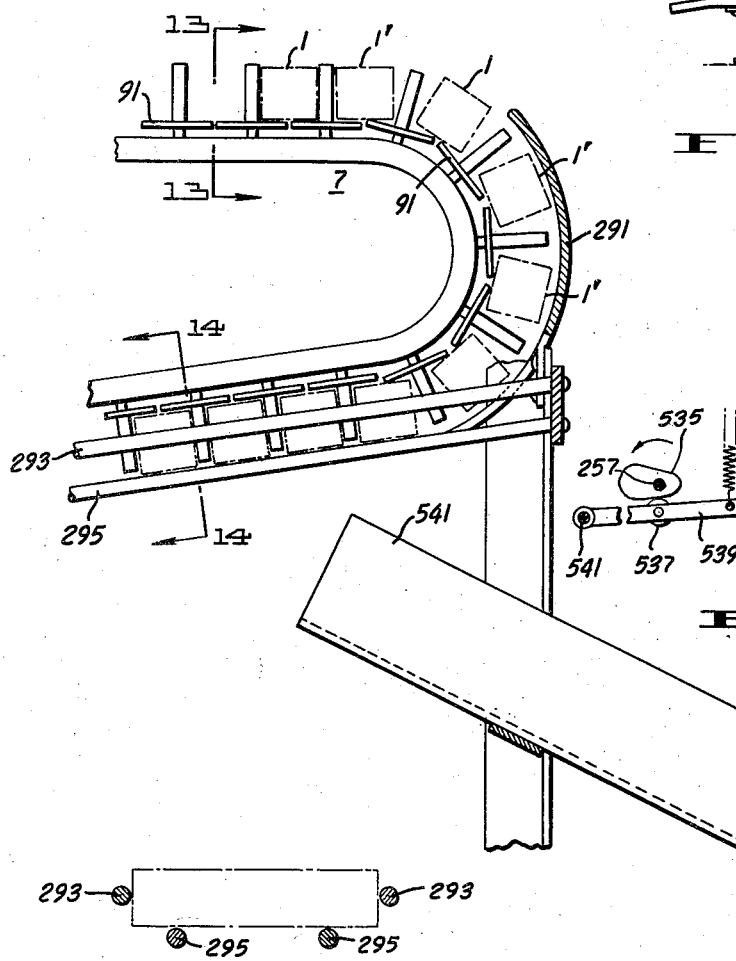
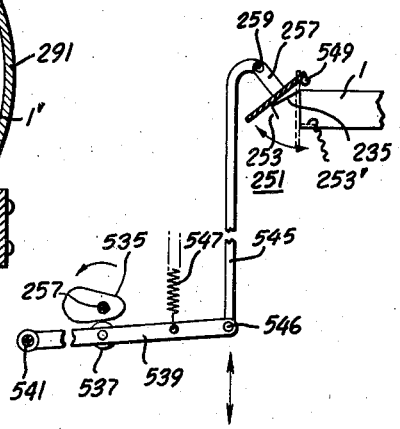
INVENTOR.
JESSE J. WARNER
BY
Lippincott & Smith
ATTORNEYS

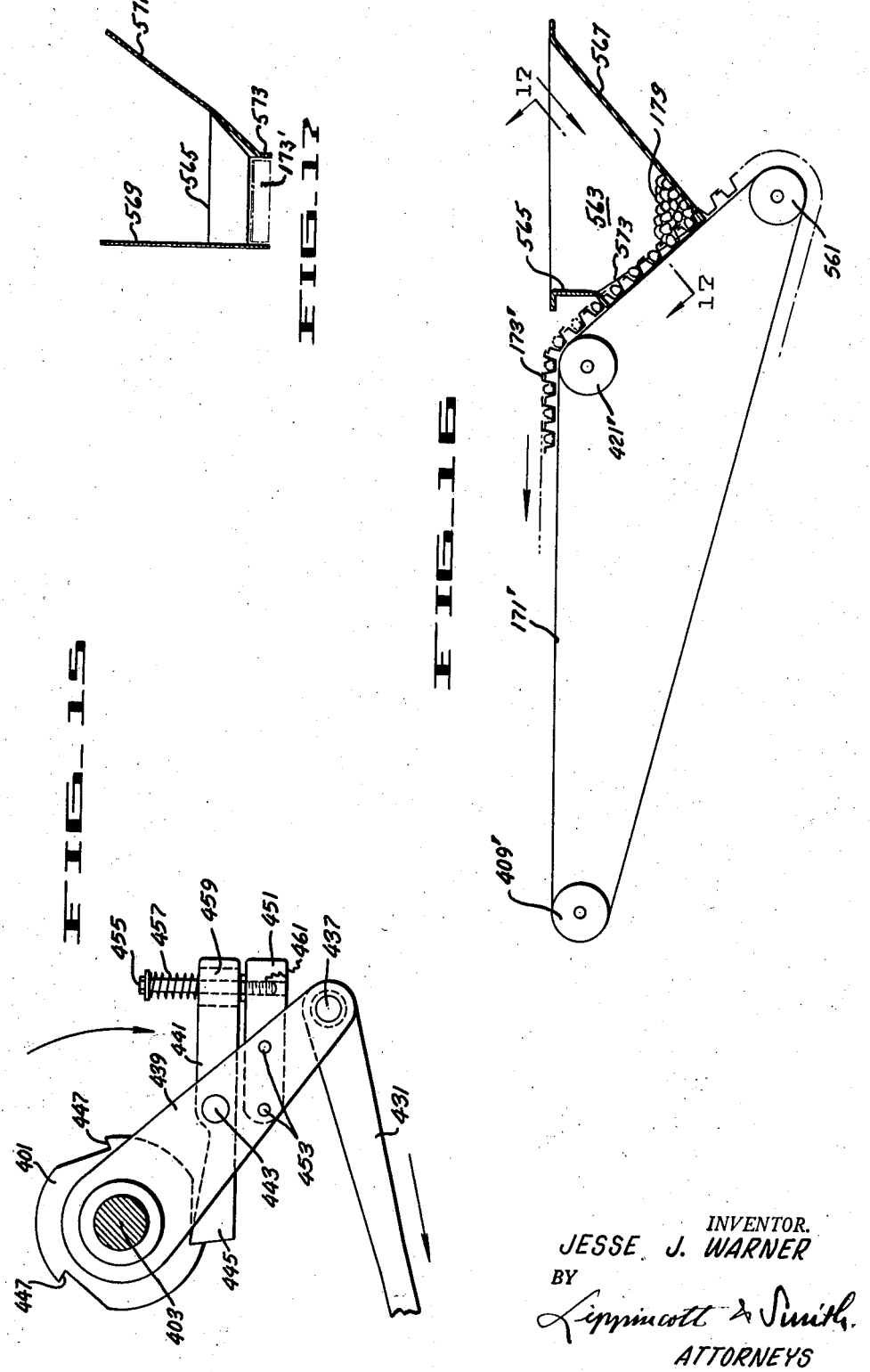

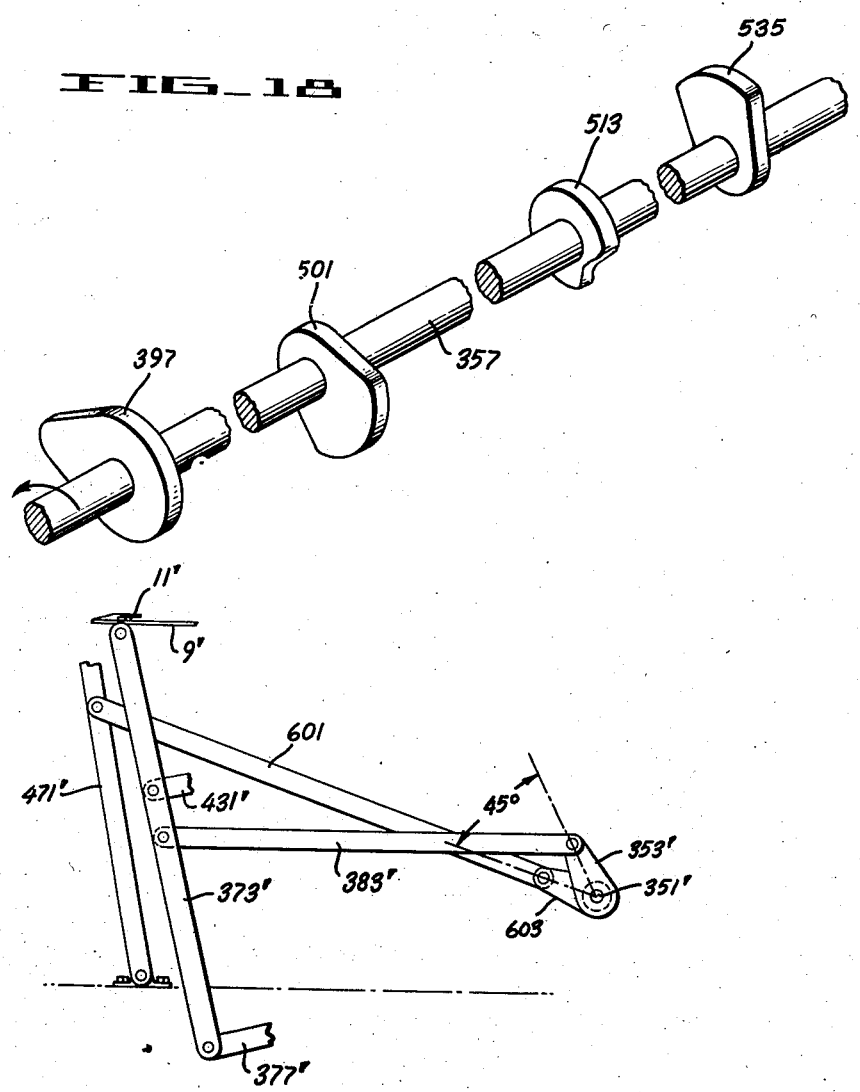

United States Patent Office 2,844,927
Patented July 29, 1958

---

2,844,927
BOX FOLDING AND LOADING MACHINE

Jesse J. Warner, Palo Alto, Calif.

Application May 20, 1952, Serial No. 288,736

36 Claims. (Cl. 53—186)

The present invention relates to an improved machine capable of automatically shaping and loading portable article containers. More particularly, the mechanism herein to be described selects blank article containers from a supply, shapes the same into enclosures of polygonal cross section, closes the flaps on an end of the containers, loads the containers through the opposite then open end with articles obtained from an article source of supply, closes the end of the containers through which the loading was accomplished, and finally discharges the filled article containers.

Disadvantages of prior art machines of the automatic character are numerous and of serious nature. For example, the machines are generally voluminous, complex and consequently expensive and often times unreliable, due in part to the complicated driving mechanisms generally employed.

Accordingly, the present invention has as certain of its objects; the provision of an automatic machine of this character which is highly compact, the provision of such a machine capable of operating from a single source of driving power, and the provision of a rugged and dependable machine which is simple in construction and consequently relatively inexpensive in the cost of manufacture.

An embodiment of the present invention may be described briefly as comprising the combination including a frame or support for locating the elements to be mentioned herein relative one to the others. Retaining means are provided on the frame for storing a supply of blank article containers which are preferably flat pre-creased continuous forms of a type adapted to be expanded into article containers through the action of expanding means which are disposed along the paths to be traversed by the blanks. Container feeding means are provided for selecting blank containers from the supply and moving them to the container expanding means where they are expanded into enclosures of polygonal cross section. After the expanding operation is completed the feeding means again engage these containers and transport them to a container conveyor having a reach of a length to define a plane of operation. This conveyor is intermittently driven through a cyclically operative driving arrangement such that the conveyor is stopped to receive a container delivered from the shaping means by the feeding means. First inner and outer flap closing means are positioned adjacent the container conveyor sequentially to close the flaps on one end of the containers as a result of the conveyor moving them in juxtaposition with the flap closing means. An article conveyor comprising a series of article receiving troughs is positioned adjacent the container conveyor with a reach thereof being disposed in the plane of operation and is adapted for movement along the plane in a direction opposed to that of the container conveyor through the medium of the driving mechanism employed for the container conveyor. Hence the conveyors are simultaneously in and out of motion.

A reciprocating ram is guided transversely of the article conveyor and through the troughs thereof during the intervals when the conveyors are motionless. Thus, loading the article containers is achieved through the medium of the ram pushing the articles from the troughs of the article conveyor into the containers located on the container conveyor opposite the ram. If desired, flap positioning means may be employed in cooperation with the ram mechanism to insure that the flaps of the article containers are retained in an open position during loading.

In order to expedite the number of containers loaded per unit time the ram is guided on its return stroke over a bridge which places it out of contact with the article conveyor and hence permits motion of the conveyors during the return stroke. Second inner and outer flap closing means are positioned adjacent the container conveyor to operate upon and close the flaps on the ends of the containers through which loading is accomplished with closure being effected subsequent to the loading operation. Finally, the loaded and closed article containers are directed onto a discharge conveyor for storage or subsequent use.

A feature of the present invention resides in the employment of a single driving source interconnected in such a manner as to operate all of the moving elements herein described. A motor per se or through a gear reduction means supplies driving power to an eccentric which is pivotally attached to a system of levers to actuate cyclically the conveyor driving mechanism, the article container feeding means, and the reciprocating ram. The motor also drives a power shaft which has fixed thereto a series of cams contoured respectively to actuate the container shaping means, the flap positioning means, and the second flap folding means at proper intervals during a cycle.

A further feature of the present invention provides for the simultaneous feeding and shaping of a plurality of containers which are directed concurrently to the container conveyor. Commensurate with this embodiment the flap closing means are adapted to operate successively upon pairs of the containers carried by the container conveyor.

Still further features of the present invention include the provision of means for automatically loading particles into the troughs of the article conveyor, and means for discarding any articles which are not boxed during the operation of the machine.

Other and further modifications, embodiments, and objects of the present invention will become apparent to those skilled in the art from a reading of the following detailed description of the invention when taken in conjunction with the accompanying drawings wherein:

Fig. 1 is a view in plan of a preferred form of the machine of the present invention with the ram bridge being omitted more clearly to reveal the structure of the ram mechanism;

Fig. 2 is a view in side elevation of the machine of Fig. 1;

Fig. 3 is a simplified schematic, based upon the structure of Fig. 1, and provided with arrows assigned to the various elements of the mechanism to indicate their relative directions of motion;

Fig. 4 is a simplified schematic showing of the driving mechanism of the machine of Figs. 1 and 2 and is based upon the side elevational drawing of Fig. 2;

Fig. 5 is a detailed representation of the article container expanding mechanism as viewed along the plane 5—5 of Fig. 1 and looking in the direction of the arrows;

Fig. 6 is a detailed representation of a portion of the lever and cam mechanism supplying the drive for certain components of the machine of Fig. 1 as viewed along the plane 6—6 of this figure;

Fig. 7 is a detailed representation in plan of the first inner flap closing means of the machine of Figs. 1 and 2;

Fig. 7A is a view in perspective of the first outer flap closing means showing article containers having outer flaps in separate positions of closure;

Fig. 8 is a view in perspective of an article container with the flaps thereof being retained in an open or loading position by the flap positioning means and the ram in the position which it occupies upon the completion of the loading stroke;

Figs. 9 and 10 are plan views of the second inner flap closing means in separate positions of operation;

Fig. 11 is a schematic representation taken in side elevation of the second outer flap closing means;

Fig. 12 is a detailed representation in side elevation of a portion of the container conveyor;

Fig. 13 is a view in cross section of the conveyor of Fig. 12 taken along the plane 13—13;

Fig. 14 is a cross-sectional view of tne structure of Fig. 12 taken along the plane 14—14 to show the container guides;

Fig. 15 is a detailed showing in side elevation of a preferred driving mechanism for determining the cyclic operation of the conveyors;

Fig. 16 is a schematic representation of automatic means for supplying articles to the article conveyor;

Fig. 17 is a cross-sectional view of a portion of the structure of Fig. 16 taken along the plane 17—17 and looking in the direction of the arrows thereof;

Fig. 18 is an exploded view in perspective showing the relative positions occupied by the various cams of the machine of the present invention at a selected time interval in a cycle of operation; and Fig. 19 is a view in side elevation showing a modification of certain components of the structure of Fig. 6.

Referring now to the drawings there is shown in Fig. 1 a blank article container 1 located in the receiving and retaining means which comprise the vertically extending rods 3, disposed in arrays, to receive and store supplies of stacked blanks. Preferably, the rods 3 are provided with peripheral grooves 5 (Fig. 2) which extend slightly radially and upwardly into the rods, thus permitting a stack of the blanks 1 to be placed among the rods 3 such that the edges of the blanks bear slightly into the grooves thereby retaining the blanks in close stacked position. In the preferred embodiment of the machine, as is evidenced in Fig. 1, two separately stacked supplies of blanks are adapted to be retained among the rods 3. In the operation of the machine the blanks are simultaneously selected from the two sources of supply and caused to traverse substantially parallel paths to the container conveyor 7.

In Fig. 1 the right hand receiving and retaining means is depicted without a supply of blanks in order better to show the operation of the container positioning or blank feeding means which comprise the feeder bars or sliders 9 each of which is equipped with a rear shoe 11 and a forward shoe 13; all of which is shown more clearly in the side elevational view of Fig. 6. In order to insure that only the lowermost blank of each stack is selected by the appropriate feeding mechanism a pair of angles 15 are biased against the support or frame 17 of the machine through the action of, for example, coil springs (not shown) located between the angles and the heads of the screws 19. The angles 15 abut inner blank flaps 21 along the beveled edges 21' thereof (Fig. 3). Upon movement of the lowermost blank by the feeding mechanism, it slides forward beneath a corner of the associated angle, biasing the latter upwardly against the force of the springs to pass therebeneath. However, the biasing force acting downwardly on the respective angles is sufficiently strong as to prevent the simultaneous passage of two blanks. It will, of course, be appreciated that other mechanisms capable of individual blank selection may be satisfactorily employed in lieu of the angles described.

The blank article containers are moved by the feeding means to the article container expanding means where the blanks are expanded into open ended enclosures of polygonal cross section. In the showing of Fig. 1 the blank 1' (previously selected from the right hand source of supply) is depicted in the expanding means, generally designated at 31, prior to the expansion thereof. Referring now jointly to Figs. 1 and 5 (the latter of which is a cross sectional view of the expanding means) it will be seen that the expanding means comprise a pair of substantially linear arms 33 and 35 pivotly secured respectively along the axes 37 and 39 to a rigid connecting link 41 with the opposite ends of the arms 33 and 35 being pivotally secured along the axes 43 and 45 respectively to a pair of riser plates 47 and 49. The riser plates 47 and 49 are hinged to the frame 17 by the brackets 51 and 53 respectively. A vertically moveable platform 55 is spaced a distance away from the frame 17 slightly less than the vertical dimension of an article container by a pair of shafts 57 which penetrate the platform and which are provided with stops 58 to support the platform in the recited position. A bolt 59 also penetrates the platform 55 and extends sufficiently beneath the frame 17 to accommodate a coil spring 60 retained thereon by a washer 61 and a nut 62. Hence the spring normally urges the platform 55 downwardly into abutting engagement with the stops 58. Operation of the expanding means is effected through vertical motion of the link 41 which causes the arms 33 and 35 to swing the riser plates 47 and 49 upward and inwardly so as to expand the article container blanks 1 and 1' into polygonal cross sectional enclosures by the plates 47 and 49 respectively biasing them against the angle irons 63 and 64 with the depending catches 65 and 67 serving to retain the enclosures in the form shown.

It should be noted that the flanges 47' and 49' of the riser plates serve to square the upper left hand corners of the blanks prior to the engagement thereof by the depending catches 65 and 67. The plan view of Fig. 1 makes it apparent that the intermediate portion of each of the riser plates, as measured along the respective flanges thereof, is cut-away or recessed to accommodate the platform 55 in order that the riser plates will not strike the depending catches. Further, the riser plates are provided respectively with forwardly extending protrusions 71 and 73 (shown in phantom outline in Fig. 5) which are adapted to bear against the inner flaps 21 of the containers upon actuation of the riser plates and consequently urge these inner flaps toward their closed positions.

After the blanks have been expanded into containers they are carried by the feeder mechanism to the container conveyor 7 (Fig. 1). If desired a pair of tunnels 81 and 83 may be provided between the expanding mechanism 31 and the container conveyor 7 in order to insure that the containers retain substantially the polygonal cross section developed in the expanding means.

The conveyor 7 comprises a plurality of individually rectangular plates 91 secured together in endless array by, for example, the chains 93 and 95 (Figs. 12 and 13) which are adapted to ride along the angle irons 97 and 99. Each of the rectangular plates 91 is fitted with uprising locating posts or pins 101, preferably three in number although not necessarily, as is shown best in Fig. 13. Hence the containers 1 and 1' shown in dotted outline in Fig. 12 are adapted to ride on adjacent plates and between the locating posts thereof. Along the upper reach of the conveyor 7 (visible in Fig. 1) and spaced therefrom there is provided a pair of rods 106 adapted to bear slightly against the containers positioned therealong to retain them in position during the operations subsequently to be described.

Located adjacent the container conveyor 7 and at a position opposite the paths which the containers follow in proceeding from the supply source to the expanding means and thence to the conveyor 7 is a pair of first inner flap closing means generally designated by the numeral 111 (Figs. 1 and 7). In Fig. 7 there is provided a detailed view in plan of the first inner flap closing means which comprises a form 113 having a pair of discontinuous U-shaped depressions dictated respectively by the arms 115 and 117 and the arms 119 and 121. By comparing Figs. 1 and 7 it will be apparent that the discontinuous U formed by the arms 115 and 117 provides the first inner flap closing means for the blanks 1 which pass through tunnel 81 and onto conveyor 7 whereas the discontinuous U formed by the arms 119 and 121 serves as the first inner flap closing means for the blanks 1 which proceed through tunnel 83 to the conveyor 7.

Fig. 7 shows, in phantom outline, a container 1 as it approaches the form 113 and particularly the position of the inner flap 21 which already has been subjected to the operation of the protrusion 71 of the expanding means. As is evidenced from this figure the feeding means force the containers 1 and 1' against the form 113 in such a manner that the flap 21 is folded inwardly by the arm 115, as shown in solid outline, while the opposed inner flap 123 is contained in the U discontinuity until movement of the container conveyor 7 and consequently of the container 1 toward the right (in Fig. 7) causes arm 117 to fold the inner flap 123 over the inner flap 21. Likewise, the first inner flap folding means operative upon the containers 1' serves to close the inner flap 123' over the inner flap 21'. It should be noted in the showing of Fig. 7 that the outer flaps 129 and 131 of the containers 1 and 1' respectively, pass beneath the first inner flap folding means and are unaffected by this flap folding station.

Next, the containers are carried by the conveyor 7 to the first outer flap folding mechanism, generally designated at 141, with the showing of Fig. 3 indicating the direction of conveyor travel, the showing of Fig. 1 indicating generally the first outer flap closing means, and the detailed drawing of Fig. 7A revealing the structure of the first outer flap closing means per se. The structure defining this flap folding station comprises essentially four members, namely, a retainer bar 143, which is an extension of the first inner flap closing arm 121, an outer flap guide 145, which may be best described as a three-dimensional S-shaped curve, a pre-creasing bar 147 (Fig. 1), and a closing rod 149. In the showing of Fig. 7A the pre-creasing bar 147 has been omitted for clarity of illustration. The function of this bar is merely to retain the body portion of the outer flap 129 in a substantially horizontal position in order that the tab 151 thereof will be folded and directed slightly upwardly by the guide 145. It should immediately be apparent that the function of the retainer bar 143 is to maintain the inner flaps 21 and 123 of container 1 in their closed poistions. As the containers are moved in the direction of the arrow in Fig. 7A the outer flap 129 is forced inwardly and upwardly by the guide 145 in a manner such that the pre-creased tab 151 is guided over the retainer bar 143 and into its correct position in the box 1. The closing rod 149 has the end thereof adjacent the guide 145 secured on the frame 17 with the opposite end being spaced a distance above the frame by the spacer 153. This particular arrangement of the closing rod permits the outer flap 129 to be biased completely into its closed position.

Referring now to Figs. 1, 3 and 8 it will be seen that a reciprocating ram 161 comprising a crosshead 163 equipped with fingers 165 is guided for movement above the frame 17, in the direction of the containers 1 carried by the conveyor 7, and in line with adjacent containers which are disposed with their outer flaps in the first outer flap closing means 141. The ram 161 is adapted to traverse an article container 171 which is comprised of a plurality of troughs 173 individually affixed to a pair of chains 174 (Fig. 2), in a manner similar to that of the rectangular plates 91 of the container conveyor (as is shown in Fig. 13) to form an endless array of individual article containing troughs. The individual troughs are best depicted in the perspective view of Fig. 8 wherein each trough terminates in a pair of flanges 175 which form an overlapping arrangement with adjacent trough flanges thus permitting the articles to be poured, as for example, down the chute 176 (Fig. 2) and onto the article conveyor 171 with the result being the positioning of the articles in the troughs 173 with the sideboards 177 serving as further guides for the articles emerging from the chute. It will be understood that the articles to be loaded into the containers may assume various shapes as well as compositions. However, for purposes of illustration, the dotted outline forms shown in one of the troughs 173 in Fig. 8 may indicate five chocolate-covered ice cream bonbons 179. It will also be appreciated that the troughs 173 are capable of carrying single items such as candy bars or tubes of tooth paste capable of being packaged in the article containers 1.

In the preferred embodiment of the invention the ram 161 is guided along a slotted plate 181 which is spaced sufficiently above the frame 17 to permit the conveyor troughs 173 to pass therebeneath. The crosshead 163 of the ram is equipped with flanges 183 positioned on either side thereof such that the flanges 183 ride in contact with the upper surface of the slotted plate 181 with the fingers 165 of the ram extending through the slots 185 and into the troughs 173 of the article conveyor 171. Hence the fingers 165 of the ram on the forward stroke thereof (toward the containers to be loaded) pass through the troughs 173 to push the articles in the troughs, such as the assumed bonbons 179, into the open containers 1.

In order to insure that the flaps on the end of the containers through which loading is progressing are in an open position a flap positioning mechanism generally designated at 191 is provided. The flap positioning means comprise a pair of chutes 193 and 195 each fixedly secured to the shaft 197 which is revolved through the action of the arm 199 and link 201 pivotally attached thereto. The link 201 is adapted to be moved vertically (by means later to be described) to revolve the chutes 193 and 195 through approximately 90 degrees measured between the horizontal and the vertical. In operation the chutes are positioned internally of the respective inner flaps of the containers during periods of arrested conveyor motion and prior to the extreme forward extension of the ram on the loading stroke. Hence the chutes bias the inner flaps 203 and 203' (Figs. 8 and 9) outwardly to permit the articles (bonbons) 179 free passage into the containers 1. From a consideration of Fig. 13 it should be apparent that the rectangular plates 91 comprising the container conveyor 7 are each provided with a downwardly extending flair at the left ends thereof to permit the chutes 193 and 195 to assume substantially horizontal poistions during the loading operation. Further, the chutes 193 and 195, along with the stationary guides 205 (Fig. 8), provide a bridge between the article conveyor 171 and the container conveyor 7.

Obviously, the container conveyor 7 and the article conveyor 171 must be arrested in motion during the loading operation. However, in order to expedite the possible number of containers which may be filled per unit time by the machine of the present invention the ram is carried out of contact with the article conveyor 171 during its return stroke, thus permitting the conveyors to operate during this interval. As is shown in Fig. 3 a ram bridge comprising a pair of girders 211 is provided adjacent the finger slots 185. In the showing of Fig. 6 the girders 211 are spaced from the slotted plate 181 at the ends adjacent the ram (left ends). Hence, on the forward stroke the ram crosshead 163 is adapted to pass longitudinally of and beneath the girders 211. Preferably, the girders 211 are comprised of resilient material, such as, spring steel with the forward ends thereof (right-hand ends in Fig. 6) being self-biased against the plate 181. Thus, on the loading stroke of the ram the crosshead 163 (Fig. 3) raises the forward ends of the girders 211 against the resiliency thereof to pass therebeneath whereupon the forward ends spring back against the plate 181, to permit the crosshead 163 to ride upon the girders and out of contact with the troughs 173 on the return stroke.

After the containers 1 are filled with articles they are carried by the article conveyor 7 to a second inner flap closing station including the mechanism shown in detail in Figs. 9 and 10. This mechanism comprises a fixed template 221 having a pair of guide pins 223 which extend through a slot 225 in a movable template 227 located in juxtaposition with the fixed template 221. The template 221 is provided with a cut-out portion bounded by an edge 229 with the dimension of the cut-away portion being slightly greater in depth than the lengths of the inner flaps 203 and 203'. The upper or movable template 227 is provided with a pair of feet 231 which move across the cut-out portion 229 when motion of a reciprocating nature is imparted to the template 227. The container conveyor 7 moves containers (only one of which is shown in Figs. 9 and 10) along the inner edges 233 of templates 221 and 227 to the position indicated by the container 1 in Fig. 9. As a result of the conveyor and consequent container movement, inner flap 203 is creased to its closed position as indicated. Conveyor 7 is then arrested in motion while template 227 is caused to move through a rather rapid reciprocal stroke; its forward or right-hand position being indicated in Fig. 10. This causes inner flap 203' to be folded to its closed position as is indicated in this figure, it being understood of course that the right hand foot 231 simultaneously closes the left hand inner flap of a container (not shown) disposed on conveyor 7 in a position along the direction of conveyor movement separated from the container illustrated in phantom outline in Figs. 9 and 10 by two containers or spaces therefor. During the inner flap closing operation, the outer flaps of the containers as represented by the outer flap 235 of the container 1' are adapted to ride upon a bar 239 (Fig. 1) which is spaced above the second inner flap closing means thus maintaining those flaps free of the inner flap closing mechanism.

The only operation remaining to provide a dispensable packaged unit is that of closing the outer flap on the ends of the containers through which loading was effected. The last station where this operation is performed upon the article containers comprises the second outer flap closing mechanism generally designated at 251 in Figs. 1 and 11. The purpose of this mechanism is that of pre-creasing the tab 253 of the outer flap 235 to its position as shown in Fig. 11 (that is substantially normal to the plane of the flap 235) and folding the outer flap 235 inwardly against the folded inner flaps 203 and 203' (Figs. 8 and 9) with the tab 253 being finally seated internally of the container 1 as is shown by the dotted line 253' of Fig. 11. The mechanism which serves to pre-crease the tab 253 may be substantially identical to a portion of the first outer flap folding mechanism 141, hence the drawings were not complicated with a repetitious showing. This portion comprises a guide similar to the guide 145 of Fig. 7A except that the curved portion of the guide adjacent the closing rod 149 and the closing rod may be omitted, because a gate 255 (Fig. 11) carried by a link 257 pivotally secured along the axis 259 (as will be described more fully hereinafter) is provided in the second outer flap closing mechanism to force the flap 235 and tab 253 inwardly of the containers 1 thereby closing this end of the containers. The pre-creasing bar 147 (Fig. 1) of course is employed to cooperate with the guide similar to that of 145 to pre-crease the tab 253 to the position shown in Fig. 11. The gate is shown in plan in Fig. 1 with the dimension thereof parallel to the conveyor 7 being comparable to the width of a pair of adjacent containers disposed on the conveyor 7. Hence it will be apparent that the gate 255 operates simultaneously to close two adjacent containers.

The filled and closed containers are transferred to a discharge conveyor 271 (Fig. 2) which is located at an angle to and substantially in vertical alinement with the conveyor 7. This conveyor comprises two pairs of sprockets 273 and 275 respectively provided with a pair of endless chains 277 in the manner of the conveyors hereinbefore described. Spaced transversely of the chains 277 is a plurality of box supports 279 each resembling an angle iron in appearance. Located intermediate the supports 279 are backing plates 281 which merely serve to extend the individual areas of the conveyor 271 capable of receiving containers. This particular construction permits the desired flexibility in the conveyor 271.

The transfer of the containers from the conveyor 7 to the discharge conveyor 271 is accomplished when the containers have reached the lowermost portion of the conveyor 7 as viewed in Fig. 2. Hence a support curve 291 (Fig. 12) is provided to retain the boxes on the conveyor 7 as they travel from the horizontal to the downwardly sloping reach of the conveyor. Also, along the downwardly sloping reach of the conveyor there is provided a plurality of guide and supporting rods respectively designated as 293 and 295 (Figs. 12 and 14). Hence the containers merely follow the guide and supports 293 and 295 to the position where the conveyor 7 follows its vertical reach whereupon the upriser posts 101 of the conveyor 7 push the containers onto the discharge conveyor 271.

The foregoing description relates to the general operation of the various mechanisms comprising a machine in accordance with the present invention. As has been previously mentioned the operation of each moving component of the machine herein described may be effected through a single source of driving power. It is now the purpose to detail the description of the drive transmission to the various elements and relate the overall cooperation inherent in the structures employed herein.

Considering first the side elevational showing of Fig. 2 and the schematic representation of Fig. 4 there is shown a motor 301 provided with an electrical attachment cord 303 and a drive pulley 305. A speed control mechanism 307 is driven by the motor 301 through a chain or belt 309 and in turn the driving motion is imparted to a gear reduction mechanism 311 via the chain or belt 313. The speed control mechanism 307 is of the conventional type wherein a pair of conical pulleys receive and transmit the motion to and from this mechanism. The effective diameters of the conical pulleys are subject to being altered by the linkage system comprising the fixed upriser link 315 which is secured to the frame 17 and supports a pair of levers 317 (only one of which is visible in Fig. 2). The conical pulleys 321 are supported between the levers 317 which are pivotally secured along the axis 323 on the fixed support 315. The levers 317 are also pivotally connected along the axis 325 to a pair of links 327 which are pivotally secured along the axis 323 on the fixed support 315. The levers 317 are also pivotally connected along the axis 325 to a pair of links 327 which are pivotally secured to a sleeve 329. The sleeve 329 is internally threaded to engage the threads 330 on the vertically extending control shaft 331 which is adapted to be turned through revolution of the control wheel 333. Thus, to control the number of boxes loaded per unit time the operator need only turn the wheel 333 to raise or lower the link 327 and thus revolve the axis 335 of the power transmission and receiving pulleys of the speed control mechanism through a sufficient angle to change the effective diameters thereof and yield the desired change in speed. With the particular arrangement of the driving construction herein to be described the machine of the present invention is capable of loading in excess of 2 boxes per second which speed if desired may be reduced to, for example, 45 or so boxes per minute through the speed control mechanism.

Preferably a suitable safety clutch generally designated as 341 is intermeshed with the gear reduction mechanism 311 to receive the drive from the speed control mechanism via the belt 313. This clutch may be of the type which employs a spring biased ball connection between the pulley 343 and a recess in the shaft 345 which turns the gear reduction mechanism 311. Hence in case the operator, who is only necessary for supervisory purposes, should accidentally drop something into the machine or in case of a faulty blank article container being transferred in from the supply, either of which might cause the machine to "jam" the ball is merely dislodged from the shaft 345 against the force of the spring thus permitting the pulley 343 to turn free of the gear reduction mechanism.

The gear reduction mechanism 311 is provided with a horizontal shaft 351, one end of which has an eccentric 353 fixed thereon and the other a pulley 355 (Figs. 1 and 4). The gear reduction mechanism drives a power shaft 357, which is mounted in suitable bearings secured to the frame 17, through a belt or chain 359 extending from a pulley 355 to a drive pulley 361 keyed to the power shaft 357. Hence the power shaft 357 is connected for continuous revolution at a speed which is determinable by the speed control mechanism 307.

Assuming now that a supply of blanks has been properly stacked among the rods 3 to provide available blanks for the right and left hand feeding mechanism and that the motor 301 has been started, the initial effective operative mechanisms are the sliders 9 (Fig. 6) equipped with the forward and rear shoes 13 and 11. Fig. 6 shows schematically a view in side elevation of a lever system adapted to supply the reciprocating movement necessary to the sliders. The slider 9 visible in Fig. 6, is pivotally secured along the axis 371 to a vertically slanting link 373, the lower extremity of which turns on an arc measured from a fixed pivot 375 through the arm 377 and the pivot 379. The upper extremity of the vertically slanting link 373 is caused to reciprocate in a substantially vertical plane through the action of the eccentric 353 which is pivotally secured along a horiontal axis 381 to a horizontal link 383 which in turn is pivotally secured to the vertically slanting link 373 by the horiontal shaft 385. Preferably the link 383 includes a slot 387 to permit adjustment of the effective length of this link and hence provide a control over extreme positions which the slider 9 may assume.

Viewing now Figs. 3 and 6 collectively it will be seen that motion imparted to the eccentric 353, in the direction indicated by the arrow in Fig. 6 and from the position there shown, will cause the vertically slanting link 373 to move the slider 9 and shoes 11 and 13 to the left to permit shoe 11 to engage the blank shown in the retaining means (comprising the rods 3) and the shoe 13 to engage the enclosure shown in the expanding means 31 after they have reached the extreme left hand position substantially as is shown in Fig. 6 and started forward. Hence the forward stroke of the slider 9 causes the blank selected from the receiving and retaining means to be deposited in the expanding means 31 and the enclosure which was picked up from the expanding means to be transferred to the conveyor 7 in the position shown in Fig. 3. It should be understood that there are actually a pair of vertically slanting links 373 and sliders 9 although only a single link and associated slider are visible in Fig. 6. Thus, for each complete (forward and backward) stroke of the sliders 9 two containers are deposited simultaneously upon the conveyor 7.

From the foregoing it should be apparent that the expanding means 31 must operate once during the interval that the slider mechanism completes a forward and backward stroke in order that the two containers delivered to the conveyor 7 may comprise enclosures of the polygonal cross section desired. Referring to Fig. 6 it may be seen that this is accomplished by providing a bar 391 which is pivoted from the frame 17 along the axis 393 and which is secured to the cross link 41 (Fig. 5) by for example, the weld 395. The bar 391 is adapted to move the arms 33 and 35 in a vertical direction as a result of the rotation of a cam 397 which is fixed upon the power shaft 357 to bear against the bar 391 and raise or lower the same in cooperation with a spring 399 which is secured between the bar 391 and the frame. As the power shaft 357 is arranged to complete the same number of revolutions per unit time as the eccentric 353, it will be seen that the riser plates 47 and 49 are caused to assume the vertical position, and consequently from the blanks located therein into container enclosures, once for each revolution of the power shaft 357 and cam 397. Hence, it is merely necessary that the maximum eccentricity of the cam 397 be located relative to the position of the eccentric 353 which drives the slanting links 373 so as to provide actuation of the riser plates during the interval when the sliders 9 are travelling rearwardly or to the left in Fig. 6. The cam 397 is contoured sharply, i. e., approximately to a point, at its maximum eccentricity, in order that the expanding means may complete their required function rapidly during the interval within which the return stroke of the sliders occurs. The maximum eccentricity of the cam 397 is disposed about 70° ahead (in the direction of rotation of the shafts 357 and 351) of the eccentric 353 in order that it will assume a vertical position during the interval of return of the sliders 9. This is also apparent from a comparison of Figs. 18 and 19.

As the container conveyor 7 and the article conveyor 171 must be driven in cooperation with the mechanisms just described, the driving means for the conveyors are interlinked with the feeding and expanding mechanism as is shown in detail in Figs. 6 and 15. This mechanism comprises a ratchet wheel 401 fixed upon a connecting shaft 403 (Fig. 4) which extends through beveled gears 405 and 407 to a driving sprocket 409 of the container conveyor 7 and also through bevel gears 411 and 413 to a driving sprocket 415 of the article conveyor 171. As is shown in Fig. 4 the beveled gears 405 and 411 are disposed in substantially parallel planes which pass transversely of the shaft 403 with the cooperating bevel gears 407 and 413 engaging the driving bevel gears on opposite sides of the shaft 403 thus to provide opposite directions of motion for the conveyors 7 and 171 with the upper reach of the conveyor 7 (looking at Fig. 4) having a direction of travel to the right and the upper reach of the conveyor 171 travelling to the left. The pair of chains 174 of the conveyor 171 are carried by a pair of driving sprockets 409 and a pair of freely turning sprockets 421, with only one of each pair being visible in Fig. 4. Likewise the chains 93 and 95 of the container conveyor 7 are carried by the pair of driving sprockets 415 and two pairs of freely turning sprockets 423 and 425 respectively which provide a horizontal reach, a vertically downwardly sloping reach and a vertical reach for this conveyor. Hence intermittent revolution of the ratchet wheel 401 imparts intermittent motion of equal displacement and of opposite direction to the conveyors 7 and 171.

The ratchet wheel 401 is connected for revolution through the linkage mechanism of Fig. 6 wherein a turnbuckle link 431, adjustable to compensate for wear in parts, is pivotally secured to a cross bar (not shown) which extends between the vertically slanting links 373. The link 431 is pivotally connected along the axis 437 to a reciprocating lever 439 which has the opposite end thereof journalled on the shaft 403 (Fig. 15). A pawl or dog 441 is pivotally attached along the axis 443 to the reciprocating lever 439 and is adapted at the end 445 thereof for abutting engagement with the peripheral ridges 447 provided on the ratchet wheel 401. As is shown in Fig. 15 three such peripheral ridges are provided on the ratchet wheel 401; however, it is to be understood that with but slight modification of the diameters of the sprockets which carry the conveyors 7 and 171 the ratchet wheel may comprise, within reason, any desired number of peripheral ridges. In order that the dog 441 will be maintained in contact with the ratchet wheel 401 a fixed arm 451 is secured to the reciprocating lever 439 by the pins 453. A screw 455 which carries a coil spring 457 is loosely fitted through an opening 459 in the dog 441 and threadably engages the fixed arm 451 through the female threads 461. This particular construction allows the spring 457 to maintain the end 445 of the dog 441 against the ratchet wheel 401 at all times.

From the foregoing it may be noted that each rearward stroke (toward the left in Fig. 6) of the slider 9 and vertically slanting links 373 causes the dog 441 to move the ratchet wheel 401 through a third of a revolution or 120°. During the forward stroke of the slider 9 and the vertically slanting links 373 the end 445 of the dog 441 is moved counterclockwise by the reciprocating lever 439 to engage the next peripheral ridge disposed around the periphery of the ratchet in a counter-clockwise direction from the one presently engaged. It should be noted that the beveled gears 405, 407, 411 and 413 all have equal diameters and an equal number of teeth so that for each cycle of ratchet wheel movement the pairs of driving sprockets 409 and 415 move in their respective directions through 120° of revolution to cause equal displacement of the container conveyor 7 and the article conveyor 171. This displacement is equal to two container widths and two trough widths.

As has been previously stated the expanding means 31 are operative during the return stroke of the slider 9 and hence during the interval that the vertically slanting links 373 are moving rearwardly. From the showings of Fig. 6 and Fig. 15 it is apparent that the shaft 403 is being rotated through the dog and ratchet mechanism during this interval, i. e., when the vertically slanting links 373 are moving to the left in Fig. 6 and hence the conveyors are each operative while the sliders 9 are inoperative in moving the blanks or enclosures and while the expanding mechanism 31 is operative to form the enclosures. Consequently, the reverse is also true and the conveyors are inoperative during the interval when the slider 9 is moving forward to transfer container enclosures from the expanding mechanism 31 to the container conveyor 7.

Considering now the first inner and outer flap closing means 111 and 141 respectively it will be seen that they are each dependent upon the containers moving past them to be effective in closing the flaps on the end of the containers disposed away from the loading mechanism. Hence, as there is no driving mechanism to describe in connection with the first flap closing means, and as it is believed that the previously presented structural description thereof is complete, further mention of these means will be of ancillary nature only.

The transmission of power to the ram or loading mechanism may best be described with reference to Figs. 1, 2, and 6. In Fig. 6 a ram lever 471 is shown pivotally secured along the axis 473 to the frame 17. The ram lever 471 engages the ram 161 through a hook and eye arrangement generally designated at 473. Such a hook and eye arrangement permits sufficient flexibility as to enable the ram 161 to move forward along the plane of the plate 181 and to follow an arcuate path over the girders 211 on the return stroke. Reciprocating motion is imparted to the ram lever 471 through a crank arm 477 which is pivotally secured to the ram lever along the axis 479 and to the horizontal link 383 along the axis 481. The reason for the crank-like shape of the arm 477, which is best shown in Fig. 2, is to provide the necessary horizontal displacement and consequent positioning of the ram mechanism and yet afford a driving connection from the eccentric 353 and link 383. From the interconnected structure depicted in Fig. 6 it will be seen that the ram 61 operates in phase with the slider 9 such that the forward and rearward strokes of the slider 9 and ram 161 occur simultaneously. This of course is due to the respective interconnections with the eccentric 353.

The flap positioning means 191 are also connected to operate in cooperation with the ram 161 as is shown in Figs. 4 and 8. It is desired to have the chutes 193 and 195 assume the position shown in Fig. 8, i. e., the horizontal or operative position after the conveyor 7 has come to rest but prior to the extreme forward extension of the ram 161 thus insuring that the inner flaps 203 and 203' are properly positioned for the loading operation. Likewise it is desirable that the chutes 193 and 195 be raised to the vertical position immediately following the ram withdrawal therefrom in order that the conveyors may resume motion upon the completion of the loading operation; it being recalled that the ram 161 follows the girders 211 on its return stroke and consequently rides out of contact with the conveyor 171.

The foregoing is accomplished through the operation of a cam 501 (Fig. 4) fixed upon the power shaft 357 in contact with a roller 503 carried by the link 201. The roller 503 is biased against the cam 501 in any conventional manner such as that shown in connection with the cam 397 which operates the expanding means. The cam 501 is not sharply contoured in the manner of the cam 397 because it is necessary that the operation of the flap positioning mechanism be effective to maintain the chutes 193 and 195 in their horizontal position during the period of time required for loading. Hence, the leading edge of the portion of the cam 501 having the greatest eccentricity is disposed in a position about 180° ahead (in the direction of the arrow in Fig. 6 or as is shown in Fig. 18) of the maximum eccentricity of cam 397 in order to move the link 201 upward to the position shown in Fig. 8 shortly after the beginning of the forward stroke of the ram 161. This is based upon a correlation between the cam 501 and the structure of Fig. 6 in the position there shown.

Subsequent to the period when the first outer closing mechanism 141 is effective to close the outer flap 129 (Figs. 7A and 8) over the inner flaps 21 and 23, the filled containers are advanced by the conveyor 7 to the second inner flap closing mechanism generally designated at 239; the operating mechanism for which may best be described with reference to Figs. 4, 9, and 10. As has previously been explained the inner flaps 203 and 203', shown in Figs. 9 and 10, of the containers are carried on the conveyor 7 in contact with the inner surface 233 of the template 227 where they are creased inwardly as is shown in Figs. 9 and 10. Subsequently, the conveyor 7 is arrested in motion and the template 227 moves rapidly to the right hand position shown in Fig. 10 and returns equally as quickly to the position shown in Fig. 9, which operation causes the feet 231 to crease the inner flaps 203' inwardly against the flaps 203.

Referring now to Fig. 4 there is shown a schematic representation of the operating mechanism generally designated at 511 which actuates the second inner flap closing means. This mechanism is operative through a cam 513 which is fixed on the power shaft 357 and which influences a follower or roller 515 carried between the arms 517. These arms are pivotally secured to the frame 17 to maintain the roller 515 in contact with the cam 513 through the action of a spring or other resilient means (not shown) in the manner of structures herein before mentioned. A vertical shaft 519 extends upward from the roller arms 517 and pivotally attaches to a bell crank 521 along the axis 523. The crank 521 is also pivotally secured along the axis 525 to an intermediate link 527 which is connected at the opposite end thereof to a depending lug 529 fastened to the template 227 by means of, for example, the screws 531 (Fig. 10). The horizontal arm of the crank forms the crank axis 532 and extends through an arcuate slot (not shown) in the frame 17 which acts as a guide to permit vertical movement of the shaft 519, as influenced by the cam 513, to produce horizontal displacement of the template 227.

As was mentioned the reciprocating movement of the template 227 preferably occurs rapidly in order to insure proper closure or creasing of the inner flap 203' and consequently the cam 513 is provided with a sharply decreasing pitch line along the forward portion of the face thereof defining the region of minimum eccentricity (Fig. 18). The trailing portion of the face of this cam in the region of minimum eccentricity is provided with a sharply increasing pitch line sufficient to return the template 227 to its normal position, in juxtaposition with template 221, prior to the next cycle of conveyor movement. The remainder of the face of this cam is rather smoothly contoured to maintain the template 227 in its normal position of juxtaposition. Thus, when the portion of the cam having the maximum eccentricity is in contact with the follower 515 the vertical shaft 519 occupies its highest position to cause the template 227 substantially to coincide with the template 221 as is shown in Fig. 9. As the second inner flap closing means may operate at any time during the period when the motion of the conveyors is arrested the minimum eccentricity of the cam 513 occupies a position approximately 180° ahead of the maximum eccentricity of the cam 397 thus affording cooperation with the structure of Fig. 6. This is due to the fact that the vertical shaft 519 should occupy its lowest or operative position sometime during the interval of the forward stroke of the ram 161 and slider 9, because during the forward or loading stroke of the ram the containers are stationary as the reciprocating lever 439 is traveling counterclockwise (in the showing of Figs. 6 and 15) and the conveyors are motionless.

The final operation performed upon the containers is that of closing the outer flaps 235 to provide filled or loaded containers. This operation, it will be recalled, is carried out by the second outer flap closing means 251 which is shown in detail in Fig. 11. A cam 535 is fixed upon the power shaft 357 and bears against a roller 537 carried by a pair of arms 539. These arms are pivotally secured to the frame by the shaft 541 and to a vertical link 545 along the axis 546. The vertical link connects to the link 257 along the axis 259. Revolution of the cam 535 imparts vertical motion to the link 545 with the roller 537 being resiliently maintained in contact with the cam through the action of a spring 547. The gate 255 is hinged to the frame by the coupling 549 so that the vertical motion of the link 545 causes the gate to swing inwardly and thus insert the flap 235 in the container 1. As in the case of the second inner flap closing means, it is desirable to actuate the gate 255 inwardly during periods of arrested motion of the conveyor 7. Consequently the cam 535 is fixed upon the shaft 357 in a position to locate the leading edge of its portion of maximum eccentricity about 40° behind the portion of maximum eccentricity of the cam 397, as is best shown in Fig. 18; it being understood for convenience of description that the followers associated with each of the cams shown in this figure occupy a vertical plane extending through the shaft 357, although the followers they may be offset from the plane if desired. Hence the gate 255 will operate inwardly to close the container simultaneously with the forward operation of the template 227 in closing the inner flaps 203'. In correlating the position of the cam 535 with the mechanism shown in Fig. 6 it should be noted that the expanding means 31 is operable during the return stroke of the slider 9 and ram 161, whereas the second outer flap closing means 251 is operable during the forward stroke of the slider and ram, i. e., during the period of arrested motion of the conveyors. Thus, as the cam 397 is effective to actuate the expanding mechanism when the maximum eccentricity thereof occupies a vertical position and as the cam 535 is effective to operate the second outer flap closing mechanism when the maximum eccentricity thereof is in a vertically downward position it may be concluded that these cams are approximately in phase as stated above and hence effective during intervals of conveyor movement and non-movement respectively.

After the last flap closing operation has been completed, the containers travel along the horizontal reach of the conveyor 7 and are guided around the right hand curved portion thereof by the supporting curve 291. A discharge chute 541 (Fig. 12) is disposed directly beneath the container conveyor 7 and in a position to receive any bonbons which for one reason or another, as for example, the supply of blanks gave out, were not boxed. The containers continue along the supports 295 through motion of the conveyor 7 until they are transferred to the discharge conveyor 271.

The sprockets 273 and 275 of the conveyor 271 are supported by the frame 17 through an arm 543 and an angle 545 (Fig. 2). Considering now Fig. 4, the source of driving power for the conveyor 271 is the bevel gear 551 which is journaled upon the power shaft 397 and which meshes with the bevel gear 553 to impart motion to the driving sprocket 275 through the belt or chain 555. Hence the motion of the conveyor 271 is continuous and the conveyor merely serves as a means for receiving the containers from the conveyor 7 and transferring them externally of the machine.

A modified embodiment of the machine of the present invention comprises the automatic loading mechanism for the article conveyor shown in Figs. 16 and 17. In Fig. 16 the reference characters indicating structure corresponding to that shown in Fig. 4 are primed. The article conveyor 171' is carried by chains, in the manner hereinbefore discussed, which extend over the sprockets 409', 421' and an added pair of sprockets 561 positioned to provide a partially vertical reach along the right hand side of the conveyor 171'. A bin 563 is disposed against this reach of the conveyor and is adapted to hold a supply of the articles or bonbons 179. The bin is comprised of forward and rear walls 565 and 567 respectively and sidewalls 569 and 571, the latter being shown in Fig. 17. Fig. 16 may be regarded as a view in side elevation with the sidewall 569 having been removed to show the triangular base portion 573 of the sidewall 571 depending therefrom and disposed adjacent to and substantially parallel with the right hand edges of the troughs 173' (considering the phantom line showing of the troughs in Fig. 17).

The bonbons 179 are introduced into the bin 563 along the sloping sidewall 571 (as is indicated by the arrow) and as the apex of the triangular base portion 573 forms the lowest part of the bin, they tend to accumulate in the vicinity of the apex i. e., in the lower right hand corner of the bin as is represented in Fig. 16. Thus, the troughs 173' of the conveyor 171' enter the bin through an opening in the rear wall 567 commensurate with which the bonbons slide laterally into the troughs which then leave the bin through an opening in the forward wall 565. Hence the principle of gravity is employed in automatically loading the troughs. However, it should be realized that the lateral force biasing the bonbons into the troughs is alleviated subsequent to the troughs being filled by movement of the troughs along the triangular base portion 573 which serves gradually to close the right hand edges of the troughs and consequently prevents any of the bonbons from being cut in half. Of course the conveyor exist or opening in the wall 567 is dimensioned only slightly larger than the troughs thus to prevent any excess bonbons which are not properly disposed in the troughs from being carried out of the bin. In fact such bonbons tend to tumble back down the inclined troughs to fill any possible vacancies therein.

Fig. 19 discloses a modification of the arrangement of Fig. 6 for operating the slider and ram mechanism. The basic difference between the mechanism of Fig. 19 and that of Fig. 6 is that in the former the crank arm 477 has been replaced by a link 601 which actuates the ram lever 471' through the revolution of an eccentric 603 fixed on the shaft 351' approximately 45° ahead of the eccentric 353'. The slider 9' is caused to reciprocate in the manner explained in connection with the apparatus of Fig. 6 with the eccentric 353' imparting motion to the horizontal link 383' and the vertically slanting links 373' (only one of which is shown). The links 373' are partially restrained in motion at their lower extremities through the arm 377 which is pivotally fixed to the frame 17 as has already been explained. Likewise the link 431' is pivotally secured to the links 373' to provide cyclic operation of the ratchet wheel 401 and consequent interrupted movement of the conveyors 7 and 171. With this particular arrangement the ram 161 (Fig. 8) is maintained the equivalent of 45° ahead of the sliders 9' in operation. This permits the fingers 165 of the ram to be completely withdrawn from the containers 1 simultaneously with the completion of the forward stroke of the sliders 9' and consequently permits the start of the interval of conveyor movement earlier in the cycle.

Having now described the invention, what is claimed is:

1. Apparatus for packaging goods comprising, in combination, a pair of endless conveyors supported in substantially parallel positions relative to each other for at least a part of their length and arranged adjacent to each other for at least a portion of the parallel relationship, one of said conveyors being adapted for supporting goods to be packaged and the other of said conveyors being adapted for locating cartons wherein goods from said one conveyor are to be packaged, means for moving the conveyors in opposite directions relative to each other and intermittently and for arresting their motion at time periods when the conveyors are so alined relative to each other that goods loaded upon one conveyor are alined with cartons on the other conveyor, goods transfer means alined with the conveyors and located at a transfer station in the region where the conveyors extend parallel to each other to shift goods from one conveyor into the cartons of the other therewith aligned conveyor during arrested conveyor motion, and means located adjacent to the carton carrying conveyor at points ahead and behind the goods transfer station for initiating a closure of the conveyor carried cartons from each end, the closure of the carton end remote from the loading end being effected first and followed by the closure of the other end subsequent to transference of goods therein and during arrested conveyor motion.

2. Apparatus for packaging goods comprising, in combination, a pair of endless conveyors supported in substantially parallel positions relative to each other for at least a part of their length and arranged adjacent to each other for at least a portion of the parallel relationship, each of said conveyors comprising a plurality of sections joined to form a continuous loop, each section of one of said conveyors being adapted for locating goods to be packaged and each section of the other of said conveyors being adapted for locating cartons wherein goods from said one conveyor are to be packaged, means for moving the conveyors in opposite directions relative to each other intermittently and arresting their motion at time periods when individual sections of each of the conveyors are so alined relative to each other that goods located upon one conveyor are alined with cartons located on the other conveyor, goods transfer means alined with the conveyors and located at a transfer station in the region where the conveyors extend parallel to each other, means to initiate operation of the goods transfer means to shift goods located upon one conveyor into the cartons located upon the other conveyor concurrently with an arrest of the conveyor motion, and means located adjacent to the carton locating conveyor at points located at either side of the goods transfer station for initiating a closure from each end of the conveyor located cartons, the closure of the carton end remote from the loading end being effected first and followed by the closure of the loading end subsequent to transference of goods therein, the closure of the loading end being effected during arrested motion of the conveyor.

3. Apparatus for packaging goods comprising, in combination, a pair of conveyor means supported in substantially parallel relationship with respect to each other for at least a part of the lengths thereof and arranged adjacent to each other for at least a portion of the parallel relationship, one of said conveyor means being adapted for supporting goods to be packaged and the other of said conveyor means being adapted for supporting cartons wherein goods from said one conveyor means are to be packaged, means for moving the goods and cartons carried by the conveyor means in opposite directions intermittently and for arresting the motion of each conveyor at time periods when the goods and cartons are alined relative to each other along the separate conveyor means, a transfer station in the region where the conveyor means extend parallel to each other, means at the transfer station to shift goods from one conveyor means into the cartons of the other conveyor means during periods of arrested conveyor motion, and means located adjacent the carton carrying conveyor means at points ahead and behind the goods transfer station for initiating a closure of the cartons from each end, the closure of the carton end remote from the loading end being effected first and followed by the closure of the other end subsequent to transference of goods therein and during arrested motion of the conveyor.

4. Apparatus for packaging goods comprising, in combination, a pair of endless conveyors supported in substantially parallel positions relative to each other for at least a part of their length and arranged adjacent to each other for at least a portion of the parallel relationship, one of said conveyors being adapted for supporting goods to be packaged in rows each extending transverse to the conveyor length and the other of said conveyors being adapted for supporting cartons wherein goods from said one conveyor are to be packaged with the cartons also each positioned transverse to the conveyor length, means for moving the conveyors intermittently in opposite directions and arresting motion at time periods when the conveyors are so alined relative to each other that goods loaded upon one conveyor are alined with cartons on the other conveyor, means located in the region where the conveyors are adjacent and parallel for transferring goods from one conveyor into the cartons on the other conveyor at time periods of arrested conveyor motion, and means located adjacent to the carton carrying conveyor at points ahead and behind the location of goods transfer for initiating a closure of cartons from each end, the end of the carton remote from the end through which loading is effected being closed first and followed by the closure of the other end subsequent to transference of goods and during arrested conveyor motion.

5. Apparatus for packaging goods comprising, in combination, a pair of endless conveyors supported in substantially parallel positions relative to each other for at least a part of their length and arranged adjacent to each other for at least a portion of the parallel relationship, one of said conveyors being adapted for supporting articles to be packaged in rows each extending transverse to the conveyor length and the other of said conveyors being adapted for supporting cartons wherein goods from said one conveyor are to be packaged with the cartons also each positioned transverse to the conveyor length, means for moving the conveyors intermittently and in step-by-step fashion in opposite directions and arresting motion at time periods when an article supporting row of one conveyor is alined with an article carrying carton supported upon the other conveyor, means operating at a location where an article supporting row and an article carrying carton are alined when motion of each conveyor is arrested and in the region where the conveyors are adjacent and parallel for transferring goods from one conveyor into the cartons on the other conveyor during periods of arrested motion of the conveyors, and means located adjacent to the carton carrying conveyor for closing the loaded end of the carton subsequent to transference of goods therein and during arrested motion of the conveyors.

6. Apparatus for packaging goods including, in combination, a first conveyor comprising a plurality of parallelly located troughs each adapted for supporting goods to be packaged and collectively forming an endless loop, a second conveyor comprising a plurality of carton-locating elements each also parallel to one another and collectively forming an endless loop, means for supporting the two conveyors substantially coplanar and in parallel relationship for at least a part of their length and adjacent to each other for at least a portion of the coplanar and parallel relationship, means for filling the troughs of the first conveyor with goods, means for moving the conveyors intermittently and arresting the motion thereof at time periods when at least one of the troughs of the first conveyor is alined relative to a carton-locating element of the other conveyor, means located at the positions of alinement and operating at times of arrested conveyor motion for transferring goods from the troughs of the first conveyor into containers of the second conveyor, means located adjacent to the second conveyor for initiating a closure of the end of the carried container remote from the loading end prior to article loading and a closure of the loaded end subsequent to transference of goods therein and means for completing the closure of the loaded end of the carton during a period of arrest of conveyor motion.

7. Apparatus for packaging goods comprising, in combination, a pair of endless conveyors supported substantially coplanar and in parallel relationship for at least a part of their length and arranged adjacent to each other for at least a portion of the coplanar and parallel relationship, a plurality of troughs disposed transversely of one of said conveyors, said troughs being adapted for supporting goods to be packaged, and the other of said conveyors being adapted for supporting containers transversely thereof, said containers being adapted to hold the goods to be packaged, means for filling the troughs of said one conveyor with goods, means for moving the conveyors intermittently in opposite directions relative to each other and arresting the motion thereof at time periods when the conveyors are so alined relative to each other that goods loaded in at least one of the troughs of said one conveyor are alined with at least one container on the other conveyor, means located in a position of alinement of a trough and a container and operative at a time of arrested conveyor motion for transferring goods from at least one conveyor trough into at least one container of the other conveyor, means located adjacent to the container carrying conveyor at points ahead of the goods transfer location for initiating a closure of carried containers from that end opposite that from which loading is effected, and means for closing the loaded end of the container subsequent to transference of goods while the conveyor is stationary.

8. Apparatus for packaging goods in suitable cartons comprising in combination, a frame, a pair of conveyors supported on the frame for movement in endless fashion, each of the conveyors having a reach to define a common plane of operation, means carried by one of said conveyors adapted to locate goods to be packaged, means carried by the other of said conveyors adapted to locate cartons to receive goods, means for supplying said one conveyor with goods, means for supplying said other conveyor with cartons, means for moving the conveyors intermittently in opposite directions and arresting conveyor movement when at least one of the means for locating goods and at least one of the means for locating cartons are alined, goods transfer means located at a transfer station along the common plane, means operative during the intervals of arrested conveyor movement to move the transfer means to shift goods from said one conveyor into cartons carried on the other conveyor, means respectively disposed along opposite sides of said other conveyor ahead and behind the transfer station relative to conveyor movement for closing the unloaded end of the cartons prior to goods transference therein and for initiating a closure of the loaded end of the cartons subsequent to goods transference therein and means for completing the closure of the loaded end during a period of arrested conveyor motion.

9. Apparatus for packaging goods in suitable cartons comprising in combination, a frame, a pair of conveyors supported on the frame for movement in endless fashion, each of the conveyors having a reach to define collectively a common plane of operation, means carried by one of said conveyors adapted to locate goods to be packaged, means carried by the other of said conveyors adapted to locate cartons to receive goods, means for supplying said one conveyor with goods, means for supplying said other conveyor with cartons, means for moving the conveyors in opposed directions in the common plane of operation and in intermittent fashion with periods of arrested conveyor movement occurring when the means for locating goods and the means for locating cartons are alined, goods transfer means located at a transfer station along the common plane and effective during the intervals of arrested conveyor movement to transfer goods from said one conveyor into cartons carried on the other conveyor, means respectively disposed along opposite sides of said other conveyor ahead and behind the transfer station relative to conveyor movement for closing an end of the cartons prior to goods transference therein and initiate closure of the other end of the cartons subsequent to goods transference therein and means operating to complete closure of the loaded end of the cartons subsequent to closure initiation and while carton movement is arrested.

10. Box loading mechanism for containers having a closable flap at opposite ends thereof, comprising, in combination, a frame, a pair of conveyors supported by the frame and having at least a portion thereof adjacent to and substantially parallel to each other, means for intermittently driving the conveyors in opposed directions of motion at least in the region of parallelism, means disposed adjacent to one of said pairs of conveyors and operative with movement of said one conveyor to close container flaps on one end of the containers, a plurality of article receiving troughs connected to be moved by the other of said pair of conveyors, means for feeding articles to said troughs, means to arrest the motion of the oppositely moving conveyors at time periods when the troughs of said other conveyor are alined with containers on said one conveyor, means operable at each time of arrested motion of the conveyors and in one selected position of trough and container alinement for bridging the space between the conveyors and permitting slidably transporting the articles from the article containing troughs into the adjacent container supported upon the parallel conveyor, and means adjacent the container carrying conveyor to initiate a closure of the loading end of the containers upon container movement subsequent to the loading, and means to complete container closure subsequent to closure initiation and operative during an arrest of conveyor motion subsequent to the loading of the container to be closed.

11. Container loading mechanism for containers having a closable flap at opposite ends thereof comprising, in combination, a frame, a pair of conveyors having adjacent reaches supported by the frame, means for intermittently driving the conveyors such that the adjacent reaches of the conveyors have opposed directions of motion, one of said conveyors being adapted to locate a supply of article containers, a plurality of article receiving troughs comprising the other of said conveyors, means for feeding the articles adapted for loading into the troughs of said other conveyor, a reciprocating ram operable transversely of said other conveyor when both conveyors are stopped to load the conveyors temporarily opposed thereto with articles from the troughs traversed by the ram, and means disposed adjacent to said one of the conveyors to close the loaded end of the containers at a time subsequent to loading when the motion of the container carrying conveyor is again arrested.

12. A loading mechanism for containers having a closable flap at opposite ends thereof comprising, in combination, a frame, a pair of conveyors having adjacent substantially coplanar reaches supported by the frame, cyclically operative means for intermittently driving the conveyors such that the adjacent reaches of the conveyors simultaneously have opposed directions of motion and periods of arrested motion in each cycle, means adapted to locate a supply of article containers on one of said pair of conveyors, a plurality of article receiving troughs comprising the other of said pair of conveyors, means for feeding articles to the troughs of said other conveyor, a reciprocating ram operable transversely of said other conveyor when the conveyors are stopped to load the containers temporarily opposed thereto with articles from the troughs traversed by the ram, means interlocking the ram, conveyor moving means to close the ram to initiate loading of the opposed containers in a portion of its operating cycle coinciding with the conveyor motion of arrest, and flap closing means disposed adjacent to said one of the conveyors to close the loading end of the container subsequent to loading and during a portion of the ram cycle coinciding with goods transfer between said conveyors.

13. Packaging apparatus comprising, in combination, a frame, a pair of conveyors supported on the frame for movement in endless fashion, said conveyors having adjacent and substantially coplanar reaches to define a plane of operation, article locating means disposed along the length of one of the conveyors, container-locating means disposed along the length of the other conveyor, means for supplying articles to the article conveyor, means for intermittently driving the conveyors in opposed directions of motion and arresting the motion of each conveyor simultaneously during intervals when the article and container locating means are alined, cyclically operable means effective to shift articles from the article conveyor into cartons on the carton conveyor during intervals of arrested conveyor motion, and means to close the loaded ends of the loaded containers subsequent to loading and at a time when the container carrying conveyor is arrested in its motion.

14. Packaging apparatus comprising, in combination, a pair of endless conveyors supported in substantially parallel positions relative to each other for at least a part of their length and arranged adjacent each other for at least a portion of the parallel relationship, one of said conveyors being adapted for supporting goods to be packaged and the other of said conveyors being adapted for supporting transversely thereof cartons wherein goods from said one conveyor are to be packaged, means for moving the conveyors intermittently in opposed directions and simultaneously arresting their motion at time periods when the conveyors are so alined relative to each other that goods loaded upon one conveyor are alined with cartons on the other conveyor, goods transfer means alined with the conveyors and located at a transfer station in the region where the conveyors extend parallel to each other to shift goods from one conveyor into the cartons of the other conveyor during arrested conveyor motion, means located adjacent and along one side of the carton carrying conveyor at a position ahead of the goods transfer station for initiating a closure of flaps on the ends of the conveyor carried cartons through which goods are transferred, a gate pivotally secured adjacent and along the other side of the carton carrying conveyor at a position behind the goods transfer station, a pair of juxtaposed templates disposed between the goods transfer station and the gate, and means for moving the gate in directions having a motional component transverse to the carton carrying conveyor and one of the templates in directions substantially parallel to the carton carrying conveyor at a time of arrested conveyor movement to close the flaps on the ends of the cartons through which goods are transferred subsequent to the interval.

15. Apparatus for packaging goods comprising, in combination, a pair of endless conveyors supported in substantially parallel positions relative to each other for at least a part of their length and arranged adjacent each other for at least a portion of the parallel relationship, one of said conveyors being adapted for supporting goods to be packaged and the other of said conveyors being adapted for supporting transversely thereof cartons wherein goods from said one conveyor are to be packaged, means for moving the conveyors intermittently in opposed directions and simultaneously arresting their motion at time periods when the conveyors are so alined relative to each other that goods loaded upon one conveyor are alined with cartons on the other conveyor, goods transfer means alined with the conveyors and located at a transfer station in the region where the conveyors extend parallel to each other to shift goods from one conveyor into the cartons of the other conveyor during arrested conveyor motion, means located adjacent and along one side of the carton carrying conveyor at a position ahead of the goods transfer station for initiating a closure of flaps on the ends of the conveyor carried cartons through which goods are transferred through motion of the carried cartons thereby, a gate pivotally secured adjacent and along the other side of the carton carrying conveyor at a position behind the goods transfer station, a pair of juxtaposed templates disposed between the goods transfer station and the gate, and means for reciprocally moving the gate in directions having a motional component transverse to the carton carrying conveyor and one of the templates in directions substantially parallel to the carton carrying conveyor during periods of arrested conveyor motion to close the flaps on the ends of the cartons opposite to the ends through which goods are transferred.

16. Apparatus for packaging goods comprising, in combination, a pair of endless conveyors supported in substantially parallel positions relative to each other for at least a part of their length and arranged adjacent each other for at least a portion of the parallel relationship, one of said conveyors being adapted for supporting goods to be packaged in rows extending transverse to the conveyor length and the other of said conveyors being adapted for supporting cartons wherein goods from said one conveyor are to be packaged with the cartons also positioned transverse to the conveyor length, means for moving the conveyors intermittently in opposite directions and simultaneously arresting motion of each conveyor at time periods when the conveyors are so alined relative to each other that goods loaded upon one conveyor are alined with cartons on the other conveyor, a transfer station located in the region where the conveyors extend parallel to each other, means operative at the transfer station to transfer goods from one conveyor into the cartons on the other conveyor during periods of arrested conveyor motion, closure means of substantially U-shape having a discontinuity displaced from the apex of the U located adjacent the carton carrying conveyor at a position ahead of the goods transfer station for receiving the inner flaps of an end of the cartons and successively closing the same upon movement of the carton carrying conveyor moving the carried cartons relative thereto, means for closing the outer flap of the same end of the cartons, further closure means located adjacent the carton carrying conveyor at a position behind the location of goods transfer station to close one of the flaps on the ends of the cartons through which the goods are transferred during conveyor motion and means to close the second flap and loaded end of the carton subsequent to the first flap closing and while the conveyor is stationary.

17. Apparatus for loading goods into cartons and closing the inner and outer flaps on each end of the cartons comprising, in combination, a pair of endless conveyors supported in substantially parallel positions relative to each other for at least a part of their length and arranged adjacent to each other for at least a portion of the parallel relationship, one of said conveyors being adapted for supporting in rows extending transverse to the conveyor length goods to be packaged and the other of said conveyors being adapted for supporting cartons wherein goods from said one conveyor are to be packaged with the cartons also positioned transverse to the conveyor length, means for moving the conveyors intermittently in opposite directions and simultaneously arresting motion of each conveyor at time periods when the conveyors are so alined relative to each other that goods loaded upon one conveyor are alined with cartons on the other conveyor, a transfer station located in the region where the conveyors extend parallel for transferring goods from one conveyor into the cartons on the other conveyor, closure means of substantially U-shape having a discontinuity displaced from the apex of the U located adjacent the carton carrying conveyor at a position ahead of the location of goods transfer for receiving the inner flaps of an end of the cartons and successively closing the same with movement of the carton carrying conveyor and conveyor carried cartons thereby, a three dimensional S-shaped curve and a guide spaced therefrom each located adjacent the carton carrying conveyor and each extending longitudinally thereof to receive the outer flaps of said ends of the cartons therebetween to fold the outer flaps of said ends of the cartons about the guide with movement of the carton carrying conveyor and cartons thereby, means for subsequently forcing the folded outer flaps of the cartons into a carton-closing position, and further closure means located adjacent the carton carrying conveyor at a position behind the location of the goods transfer station to close the flaps on the ends of the cartons through which the goods are transferred.

18. Apparatus for loading and closing the inner and outer flaps on each end of cartons comprising, in combination, a pair of endless conveyors supported in substantially parallel positions relative to each other for at least a part of their length and arranged adjacent to each other for at least a portion of the parallel relationship, one of said conveyors being adapted for supporting in rows extending transverse to the conveyor length goods to be packaged and the other of said conveyors being adapted for supporting cartons wherein goods from said one conveyor are to be packaged with the cartons also positioned transverse to the conveyor length, means for moving the conveyors intermittently in opposite directions and simultaneously arresting conveyor motion at time periods when the conveyors are so alined relative to each other that goods loaded upon one conveyor are alined with cartons on the other conveyor, means located in the region where the conveyors extend parallel and adjacent for transferring goods from one conveyor into cartons on the other conveyor, means located adjacent the carton carrying conveyor effective to close the inner and outer flaps on the ends of the cartons remote from the ends through which goods are transferred, a pair of juxtaposed templates disposed adjacent the carton carrying conveyor, each of said templates being recessed to receive the inner flaps on the ends of the cartons through which goods are transferred, means for reciprocally moving one of the templates relative to the other in a direction longitudinally of the carton carrying conveyor thereby to close one of said inner flaps, said templates biasing the other of said inner flaps closed with movement of the carton carrying conveyor and carried cartons relative thereto, and means disposed adjacent the carton carrying conveyor effective subsequent to closure of the inner flaps to close the outer flaps on the ends of the cartons through which the goods are transferred.

19. Apparatus for loading and closing inner and outer flaps on each end of cartons to be loaded comprising, in combination, a pair of endless conveyors supported in substantially parallel positions relative to each other for at least a part of their length and arranged adjacent to each other for at least a portion of the parallel relationship, one of said conveyors being adapted for supporting in rows extending transverse to the conveyor length goods to be packaged and the other of said conveyors being adapted for supporting cartons wherein goods from said one conveyor are to be packaged with the cartons also positioned transverse to the conveyor length, means for moving the conveyors intermittently in opposite directions and simultaneously arresting motion of each of the conveyors at time periods when the conveyors are so alined relative to each other that goods loaded upon one conveyor are alined with cartons on the other conveyor, a transfer station located in the region where the conveyors extend parallel for transferring goods from one conveyor into cartons on the other conveyor during periods of arrested conveyor motion, means located adjacent the carton carrying conveyor effective to close the inner and outer flaps on the ends of the cartons remote from the ends through which goods are transferred during periods of conveyor movement, a pair of juxtaposed templates disposed adjacent the carton carrying conveyor, each of said templates being recessed to receive the inner flaps on the ends of the cartons through which goods are transferred, means for reciprocally moving one of the templates relative to the other in a direction longitudinally of the carton carrying conveyor thereby to close one of said inner flaps during a period of arrested conveyor movement, said templates biasing the other of said inner flaps closed with movement of the carton carrying conveyor and the thereby carried carton, and means disposed adjacent the carton carrying conveyor effective subsequent to closure of the inner flaps to close the outer flaps on the ends of the cartons through which the goods are transferred during subsequent periods of arrested conveyor movement.

20. Apparatus for loading and closing inner and outer flaps on each end of cartons adapted to be loaded comprising, in combination, a pair of endless conveyors supported in substantially parallel positions relative to each other for at least a part of their length and arranged adjacent to each other for at least a portion of the parallel relationship, one of said conveyors being adapted for supporting in rows extending transverse to the conveyor length goods to be packaged and the other of said conveyors being adapted for supporting cartons wherein goods from said one conveyor are to be packaged with the cartons also positioned transverse to the conveyor length, means for simultaneously moving the conveyors intermittently in opposite directions and arresting motion of each of the conveyors at time periods when the conveyors are so alined relative to each other that goods loaded upon one conveyor are alined with cartons on the other conveyor, a transfer station located in the region where the conveyors extend parallel for transferring goods from one conveyor into the cartons on the other conveyor during intervals of arrested conveyor movement, means located adjacent the carton carrying conveyor at a position ahead of the location of goods transfer effective with movement of the carton carrying conveyor and carried cartons to close the inner flaps on the ends of the cartons remote from the ends through which the goods are transferred, a three dimensional S-shaped curve and a guide spaced therefrom each located adjacent the carton carrying conveyor and each extending longitudinally thereof to receive therebetween the outer flaps on the ends of the cartons remote from the ends through which the goods are transferred to fold said outer flaps about the guide with movement of the carton carrying conveyor and carried cartons thereby, means for subsequently forcing said outer flaps into carton-closed positions upon movement of the cartons relative thereto, and further means located adjacent the carton carrying conveyor to close the inner and outer flaps on the ends of the cartons through which the goods are transferred.

21. Packaging apparatus comprising, in combination, a pair of endless conveyors supported in substantially parallel positions relative to each other for at least a part of their length and arranged adjacent to each other for at least a portion of the parallel relationship, one of said conveyors being adapted for supporting in rows extending transverse to the conveyor length goods to be packaged and the other of said conveyors being adapted for supporting cartons wherein goods from said one conveyor are to be packaged with the cartons also positioned transverse to the conveyor length, means for moving the conveyors simultaneously intermittently in opposite directions and arresting motion of each conveyor at time periods when the conveyors are so alined relative to each other that goods loaded upon one conveyor are alined with cartons on the other conveyor, means located in the region where the conveyors are adjacent and parallel for transferring goods from one conveyor into the cartons on the other conveyor, means disposed adjacent the carton carrying conveyor effective with movement thereof to close the inner and outer flaps on the ends of the cartons remote from the ends through which the goods are transferred, a pair of juxtaposed templates disposed adjacent the carton carrying conveyor, each of said templates being recessed to receive the inner flaps on the ends of cartons through which goods are transferred, means for reciprocally moving one of the templates relative to the other in a direction substantially parallel to the direction of motion of the carton carrying conveyor thereby to close one of said last mentioned inner flaps, the other of said last mentioned inner flaps being closed with movement of the carton carrying conveyor in proximity with the templates, a gate pivotally secured adjacent the carton carrying conveyor, and means for reciprocally moving the gate in directions having a motional component transverse to the carton carrying conveyor to close the outer flaps on the ends of the cartons through which goods are transferred.

22. Packaging apparatus comprising, in combination, a pair of endless conveyors supported in substantially parallel positions relative to each other for at least a part of their length and arranged adjacent to each other for at least a portion of the parallel relationship, one of said conveyors being adapted for supporting in rows extending transverse to the conveyor length goods to be packaged and the other of said conveyors being adapted for supporting cartons wherein goods from said one conveyor are to be packaged with the cartons also positioned transverse to the conveyor length, means for moving the conveyors intermittently in opposite directions and arresting motion at time periods when the conveyors are so alined relative to each other that goods loaded upon one conveyor are alined with cartons on the other conveyor, cyclically operable means located in the region where the conveyors extend parallel and adjacent for transferring goods from one conveyor into the cartons on the other conveyor when the conveyors are alined, means disposed adjacent the carton carrying conveyor effective during movement thereof and while carried cartons are moved thereby to close the inner and outer flaps on the ends of the cartons remote from the ends through which the goods are transferred, a pair of juxtaposed templates disposed adjacent the carton carrying conveyor, each of said templates being recessed to receive the inner flaps on the ends of the cartons through which goods are transferred, means for reciprocally moving one of the templates relative to the other in directions substantially parallel to the direction of motion of the carton carrying conveyor thereby to close one of said last mentioned inner flaps while the associated carton is maintained stationary by the arrested carton carrying conveyor, the other of said last mentioned inner flaps being closed with subsequent movement of the carton carrying conveyor and carried carton in proximity with the then arrested templates, a gate pivotally secured adjacent the carton carrying conveyor, and means for reciprocally moving the gate also during periods of arrested conveyor motion in directions having motional components transverse to the carton carrying conveyor to force the outer flaps on the ends of the cartons through which goods are transferred into carton-closed positions.

23. For use in a machine of a type having a movable carton conveyor and a goods conveyor and which is adapted to shape carton blanks, load the shaped cartons with goods, and close the outer and inner flaps on the ends of the cartons, means for closing the inner flaps on one end of the conveyor carried cartons comprising a closure having a substantially U-shaped recess disposed adjacent the carton conveyor, said closure having a discontinuity displaced from the apex of the U, means for moving cartons onto the carton conveyor such that an inner flap follows a portion of the contour of the U-shaped recess and the opposed inner flap passes through the discontinuity whereby subsequent movement of the carton conveyor and carried cartons closes the inner flaps on said end of the cartons.

24. For use in a machine of a type having an intermittently movable carton conveyor and a simultaneously intermittently movable goods conveyor and which is adapted to shape carton blanks, load the shaped cartons with goods, and close the outer and inner flaps on the ends of the cartons to box the goods, means for closing the inner flaps on one end of the conveyor carried cartons comprising a closure having a substantially U-shaped recess disposed adjacent the carton conveyor with the mouth of the U facing the carton conveyor, said closure having a discontinuity displaced from the apex of the U, means for moving cartons during periods of arrested conveyor movement onto the carton conveyor and into contact with the closure such that an inner flap of the carton being moved follows a portion of the contour of the U-shaped recess and the opposed inner flap passes through the discontinuity whereby subsequent movement of the carton conveyor and carried carton relative to the closure successively closes the inner flaps on said end of the cartons.

25. For use in a machine of a type having at least an intermittently movable carton conveyor and which is adapted to shape carton blanks, load the shaped cartons with goods, and close the outer and inner flaps on the ends of the cartons, means for closing the inner flaps on an end of the conveyor carried cartons comprising a pair of juxtaposed templates disposed adjacent the carton conveyor, each of said templates being recessed to receive said last mentioned inner flaps, and means for reciprocally moving one of said templates relative to the other during intervals of arrested conveyor motion in a direction substantially parallel to the direction of conveyor motion thereby to close one of said last mentioned inner flaps, the other of said last mentioned inner flaps being closed with subsequent movement of the carton conveyor and conveyor carried cartons in proximity with the templates.

26. For use in a machine of a type having simultaneously intermittently movable carton and goods conveyors and which is adapted to shape carton blanks, load the shaped cartons with goods, and close the outer and inner flaps on the ends of the cartons, means for closing the inner flaps on an end of the conveyor carried cartons comprising a pair of juxtaposed templates disposed adjacent the carton conveyor, each of said templates being recessed to receive said last mentioned inner flaps, and means for reciprocally moving one of said templates relative to the other in a direction substantially parallel to the length of the conveyors during intervals of arrested conveyor motion to fold one of said last mentioned inner flaps in the direction of the carton and adjacent the end thereof, the other of said last mentioned inner flaps being folded against said one inner flap with subsequent movement of the carton conveyor and carried cartons in proximity with the arrested templates.

27. Apparatus for packaging goods in suitable cartons comprising, in combination, a frame, a pair of conveyors supported on the frame for movement in endless fashion, each of the conveyors having a reach to define a common plane of operation, a series of troughs each arranged substantially parallel to each other and transverse to the motional path of one of said conveyors, said troughs being adapted to locate goods for movement by the conveyor, means disposed on the other of said conveyors adapted to locate cartons transversely thereof, means for supplying goods for loading in cartons to the troughs of said one conveyor, means for supplying cartons to the other conveyor, means for simultaneously moving the conveyors in opposed directions intermittently and arresting conveyor movement when at least one of the troughs and at least one of the carton locating means are alined, a ram slidably mounted on the frame, means for guiding the ram for reciprocating motion transverse to the trough carrying conveyor so as in one direction to pass through the trough during intervals of arrested conveyor movement to transfer goods from said one conveyor into cartons carried on the other conveyor, and means respectively disposed along opposite sides of said other conveyor ahead of and behind the ram as determined by conveyor movement for respectively closing a first end of the cartons prior to goods transference therein during conveyor motion and a second end of the cartons subsequent to goods transference therein during arrest of conveyor motion.

28. Apparatus for packaging goods comprising, in combination, a frame, a pair of endless conveyors supported by the frame in substantially coplanar relation and in parallel positions for at least a part of their length and arranged adjacent to each other for at least a portion of the coplanar and parallel relationship, a plurality of troughs disposed transversely of one of said conveyors adapted for supporting goods to be packaged and the other of said conveyors being adapted for supporting containers transversely thereof wherein the goods are to be packaged, means for filling the troughs of said one conveyor with goods, means for moving the conveyors intermittently in opposed directions and for arresting the motion thereof at time periods when the conveyors are so alined relative to each other that goods loaded in the troughs of said one conveyor are alined with containers on the other conveyor, a reciprocating ram located in the region where the conveyors extend parallel for transferring goods during periods of arrested conveyor motion from the troughs of said one conveyor into containers of the other conveyor on the forward stroke thereof, a bridge spaced from the frame to carry the ram out of contact with said troughs on the return stroke thereof, and means located adjacent the container carrying conveyor at points ahead of and behind the ram relative to conveyor movement for initiating a closure of containers from each end, the container end remote from the end through which loading is effected being closed first during conveyor movement and the other end of the containers being closed subsequent to transference of goods therein during an arrest of conveyor motion.

29. Apparatus for packaging goods comprising, in combination, a frame, a pair of endless conveyors supported by the frame in substantially coplanar relation and in parallel positions for at least a part of their length and arranged adjacent to each other for at least a portion of the coplanar and parallel relationship, a plurality of troughs disposed transversely of one of said conveyors adapted for supporting goods to be packaged, the other of said conveyors being adapted for supporting containers transversely thereof wherein the goods are to be packaged, means for filling the troughs of said one conveyor with goods, means for moving the conveyors intermittently and simultaneously in opposite directions and for arresting the motion thereof at time periods when the conveyors are so alined relative to each other that goods loaded in the troughs of said one conveyor are alined with containers on the other conveyor, a loading ram supported for reciprocating movement transverse to the motional path of said one conveyor, means for moving the ram in its forward stroke transverse to said one conveyor and substantially in the plane of the trough supported goods to push goods from troughs traversed by the ram into opposed containers, means for removing the ram during its return stroke from the plane in which it was advanced relative to said one conveyor, and means located adjacent the container carrying conveyor at points ahead of and behind the ram relative to conveyor movement for initiating a closure of containers from each end, the container end remote from the end through which loading is effected being closed first during conveyor motion and followed by the closure of the other end subsequent to transference of goods therein during an arrest of conveyor motion.

30. For use in a machine having simultaneously intermittently movable carton and goods conveyors disposed in adjacent positions to define a common plane, and which is adapted to shape carton blanks, load the shaped cartons with goods, and close the flaps on the ends of the cartons, means for transferring goods from the goods conveyor into cartons on the carton conveyor comprising a reciprocating ram operable transversely of the goods conveyor, means for driving the ram on the forward stroke along the common plane and across the goods conveyor to shift goods disposed thereon into cartons carried by the carton conveyor during periods of arrested conveyor movement, and a ram bridge spaced above the goods conveyor to carry the ram out of the common plane on the return stroke during periods of conveyor movement.

31. For use in a machine having simultaneously intermittently movable carton and goods conveyors disposed in adjacent positions to define a common plane, and which is adapted to shape carton blanks, load the shaped cartons with goods and close the inner and outer flaps on the ends of the cartons, means for transferring goods from the goods conveyor into cartons on the carton conveyor comprising a ram adapted to move transversely of the goods conveyor, means for reciprocally driving the ram along the common plane to shift goods from the goods conveyor into cartons on the carton conveyor during intervals of arrested conveyor movement, and flap positioning means disposed between the conveyors in line with the ram and operable cyclically to retain the inner flaps on the ends of the cartons through which the goods are transferred in an open condition during the loading interval and to provide a bridge between the two conveyors across which to transport the goods.

32. For use in a machine having simultaneously intermittently movable carton and goods conveyors disposed in adjacent positions to define a common plane, and which is adapted to shape carton blanks, load the shaped cartons with goods and close the inner and outer flaps on the ends of the cartons, means for transferring goods from the goods conveyor into cartons on the carton conveyor comprising a ram adapted to move transversely of the goods conveyor, means for reciprocally driving the ram along the common plane to shift goods from the goods conveyor into cartons on the carton conveyor during intervals of arrested conveyor movement, means for cyclically removing the ram from the common plane to permit conveyor movement, and flap positioning means disposed between the conveyors in line with the ram and operable cyclically to retain the inner flaps on the ends of the cartons through which the goods are transferred in an open condition during the loading interval and to provide a bridge between the two conveyors across which to transport the goods.

33. Container blank shaping and loading mechanism comprising, in combination, a frame, a pair of conveyors supported on the frame for movement in endless fashion, each of the conveyors having a reach to define mutually a common plane of operation, means carried by one of the conveyors for locating containers therealong, means carried by the other of the conveyors for locating articles adapted to be packaged in the containers, means for intermittently moving the conveyors in opposite directions along the plane of operation and cyclically arresting their motion when the conveyor carried articles to be packaged are opposed to the conveyor carried containers, a loading station disposed along the common plane adjacent the conveyors, cyclically operative means located at the loading station effective during intervals of arrested conveyor movement to shift articles from said other conveyor into conveyor carried cartons opposed thereto, and means disposed adjacent said one conveyor adapted to close the ends of the conveyor carried cartons.

34. Container loading mechanism for containers having closable flaps at each end thereof, comprising in combination, a frame, a pair of conveyors having adjacent reaches supported by the frame, means for intermittently driving the conveyors such that the adjacent reaches of the conveyors have opposed directions of motion, first flap closing means disposed adjacent one of said conveyors and operative with movement of said one conveyor to close the container flaps on one end of the containers, a plurality of article receiving troughs in transverse alinement with and carried by the other of said conveyors, a bin secured to the frame in a position to extend above the article conveyor, at least one of the sides of the bin having an approximately triangular base portion disposed adjacent similar ends of the troughs with the apex thereof being oriented opposite to the direction of article conveyor motion, the remainder of said side extending from the base portion in a direction away from the article conveyor to provide an article path to the troughs, a reciprocating ram operable transversely of said other conveyor when the conveyors are stopped to load the containers temporarily opposed thereto with articles from the troughs traversed by the ram, and second flap closing means disposed adjacent said one of the conveyors to close the other end of the containers at times of arrested conveyor motion.

35. Apparatus for packaging goods comprising, in combination, a pair of endless conveyors supported in substantially parallel positions relative to each other for at least a part of their length and arranged adjacent each other for at least a portion of the parallel relationship, one of said conveyors being adapted for supporting goods to be packaged and the other of said conveyors being adapted for supporting cartons wherein goods are to be packaged, means for simultaneously moving the conveyors intermittently in opposed directions in the region of the parallel relationship and arresting their motion at time periods when the conveyors are so alined relative to each other that articles loaded upon one conveyor are alined with containers on the other conveyor, means located adjacent said one conveyor effective during the intervals of conveyor arrested motion to transfer goods from one conveyor into the cartons of the other conveyor, and means located adjacent the carton carrying conveyor at points ahead and behind the means to transfer goods for initiating a closure of the cartons from each end, the closure of the carton end remote from the loading end being first and during conveyor motion and the closure of the other end being subsequent to transference of goods therein and completed during arrested conveyor motion.

36. Apparatus for packaging goods comprising, in combination, a pair of endless conveyors supported in substantially parallel positions relative to each other for at least a part of their length and arranged adjacent each other for at least a portion of the parallel relationship, one of said conveyors being adapted for supporting goods to be packaged and the other of said conveyors being adapted for supporting cartons wherein goods are to be packaged, means for moving the conveyors intermittently and arresting their motion at time periods when the conveyors are so alined relative to each other that articles loaded upon one conveyor are alined with containers on the other conveyor, means located adjacent to said one conveyor effective during the intervals of conveyor arrested motion to transfer goods from one conveyor into the cartons of the other conveyor, and means located adjacent the carton carrying conveyor at points ahead and behind the means to transfer goods for initiating a closure of the cartons from each end, the closure of the carton end remote from the loading end being first and during conveyor motion and the closure of the other end being subsequent to transference of goods therein and completed at times when the conveyor motion is arrested.

References Cited in the file of this patent

UNITED STATES PATENTS

| Number | Name | Date |
|---|---|---|
| 632,103 | Craw | Aug. 29, 1899 |
| 1,118,424 | Johnson | Nov. 24, 1914 |
| 1,177,719 | Milmoe | Apr. 4, 1916 |
| 1,193,494 | Crocker | Aug. 1, 1916 |
| 1,313,974 | Anderson | Aug. 26, 1919 |
| 1,364,168 | Willford | Jan. 4, 1921 |
| 1,661,848 | Plass | Mar. 6, 1928 |
| 1,893,389 | Bellman | Jan. 3, 1933 |
| 1,935,269 | Jones | Nov. 14, 1933 |
| 1,979,207 | Milmoe | Oct. 30, 1934 |
| 2,029,935 | Milmoe | Feb. 4, 1936 |
| 2,133,248 | Jones | Oct. 11, 1938 |
| 2,277,783 | Scharf | Mar. 31, 1942 |
| 2,510,251 | Perilli | June 6, 1950 |
| 2,583,708 | Rose | Jan. 29, 1952 |
| 2,585,829 | Perkins | Feb. 12, 1952 |

FOREIGN PATENTS

| Number | Country | Date |
|---|---|---|
| 612,328 | Germany | Apr. 18, 1935 |